(12) United States Patent
Georgeson et al.

(10) Patent No.: US 12,005,468 B2
(45) Date of Patent: *Jun. 11, 2024

(54) END EFFECTORS AND METHODS FOR ADHESIVELY ATTACHING A FIRST PART TO A SECOND PART

(71) Applicant: The Boeing Company, Chicago, IL (US)

(72) Inventors: Gary E. Georgeson, Tacoma, WA (US); Marc J. Piehl, Renton, WA (US); Joseph L. Hafenrichter, Auburn, WA (US)

(73) Assignee: The Boeing Company, Arlington, VA (US)

( * ) Notice: Subject to any disclaimer, the term of this patent is extended or adjusted under 35 U.S.C. 154(b) by 325 days.

This patent is subject to a terminal disclaimer.

(21) Appl. No.: 17/494,557

(22) Filed: Oct. 5, 2021

(65) Prior Publication Data

US 2023/0107591 A1 Apr. 6, 2023

(51) Int. Cl.
| | | |
|---|---|---|
| *B05C 11/00* | (2006.01) | |
| *B05C 5/02* | (2006.01) | |
| *B25J 15/00* | (2006.01) | |

(52) U.S. Cl.
CPC ............... *B05C 11/00* (2013.01); *B05C 5/02* (2013.01); *B25J 15/0019* (2013.01)

(58) Field of Classification Search
CPC ........ B05C 11/00; B05C 5/02; B25J 15/0066; B29C 70/38; B29C 70/382; B29C 70/384; B29C 70/386; B29C 70/388; B32B 41/00
See application file for complete search history.

(56) References Cited

U.S. PATENT DOCUMENTS

| | | | |
|---|---|---|---|
| 4,750,960 A | 6/1988 | Bubeck | |
| 4,795,451 A | 1/1989 | Buckley | |
| 8,651,046 B1 | 2/2014 | Davancens et al. | |
| 2003/0137080 A1* | 7/2003 | Bouras | B05C 11/101 |
| | | | 264/272.17 |
| 2017/0197350 A1 | 7/2017 | Song | |
| 2019/0344293 A1* | 11/2019 | Knott | B05B 12/004 |
| 2023/0107716 A1* | 4/2023 | Georgeson | B05C 5/02 |
| | | | 156/64 |

* cited by examiner

*Primary Examiner* — George R Koch
(74) *Attorney, Agent, or Firm* — Kunzler Bean & Adamson

(57) ABSTRACT

An end effector, for adhesively attaching a first part to a second part, comprises a support, a first nozzle, movable relative to the support, and a second nozzle, movable relative to the support. The first nozzle comprises a first-nozzle-body outlet port and a first-nozzle separator plate. The second nozzle comprises a second-nozzle-body outlet port and a second-nozzle separator plate. The end effector additionally comprises a first ultrasonic-sensor roller that is rotatable relative to the support, translationally fixed relative to support, and located between the first nozzle and the second nozzle. The end effector also comprises a second ultrasonic-sensor roller that is rotatable relative to the support, translationally fixed relative to support, and located between the first ultrasonic-sensor roller and the second nozzle.

20 Claims, 12 Drawing Sheets

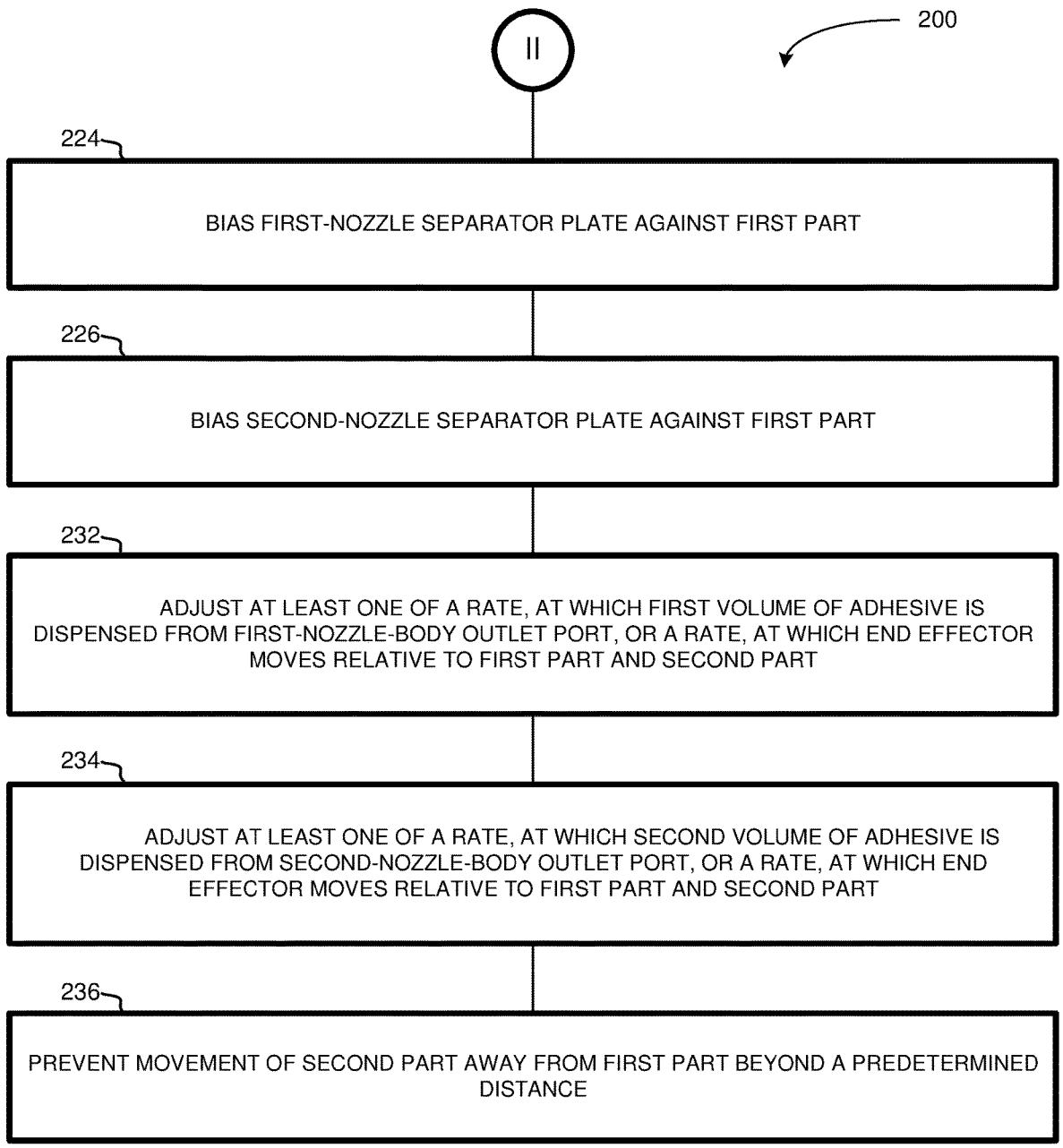
FIG. 9C
(CONTINUED FROM FIG. 9B)

END EFFECTORS AND METHODS FOR ADHESIVELY ATTACHING A FIRST PART TO A SECOND PART

TECHNICAL FIELD

Described herein are end effectors and methods for adhesively attaching a first part to a second part.

BACKGROUND

During assembly of structures, such as an aircraft or a component thereof, parts are often adhesively interconnected. It is desirable to fully automate deposition of the adhesive between the parts to reduce cost and manufacturing lead time. However, the need for creating and maintaining a properly sized gap between faying surfaces of the parts for receiving the adhesive complicates the task of automating the deposition of adhesive between the faying surfaces. Automated deposition of adhesive is further complicated by the fact that propagation of the adhesive between the parts must often be controlled to prevent the adhesive from being deposited in locations where its presence is undesirable or unnecessary.

SUMMARY

Accordingly, apparatuses and methods, intended to address at least the above-identified concerns, would find utility.

The following is a non-exhaustive list of examples of the subject matter, disclosed herein.

Disclosed herein is an end effector for adhesively attaching a first part to a second part. The end effector comprises a support and a first nozzle. The first nozzle is coupled to the support and is movable relative to the support. The first nozzle comprises a first-nozzle body, comprising a first-nozzle-body outlet port. The first nozzle also comprises a first-nozzle separator plate, extending from the first-nozzle body. The end effector further comprises a second nozzle, coupled to the support and movable relative to the support. The second nozzle comprises a second-nozzle body, comprising a second-nozzle-body outlet port. The second nozzle also comprises a second-nozzle separator plate, extending from the second-nozzle body. The end effector additionally comprises a first ultrasonic-sensor roller, coupled to the support such that the first ultrasonic-sensor roller is rotatable relative to the support and is translationally fixed relative to the support. The first ultrasonic-sensor roller is located between the first nozzle and the second nozzle. The end effector also comprises a second ultrasonic-sensor roller, coupled to the support such that the second ultrasonic-sensor roller is rotatable relative to the support and is translationally fixed relative to the support. The second ultrasonic-sensor roller is located between the first ultrasonic-sensor roller and the second nozzle.

The end effector provides for depositing the adhesive, through the first-nozzle-body outlet port and the second-nozzle-body outlet port, into corresponding spaces (e.g., the first space and the second space) between the first part and the second part. The first-nozzle separator plate promotes separation between the first part and the second part to create the first space. Similarly, the second-nozzle separator plate promotes separation between the first part and the second part to create the second space. The first-nozzle-body outlet port and the first-nozzle separator plate enable the adhesive to be deposited, through the first-nozzle-body outlet port, into the first space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. Likewise, the second-nozzle-body outlet port and the second-nozzle separator plate enable the adhesive to be deposited, through the second-nozzle-body outlet port, into the second space when the second-nozzle separator plate is located between and is separating the first part and the second part. Accordingly, a configuration of the second-nozzle-body outlet port and the second-nozzle separator plate maintains separation between the first part and the second part as the adhesive is deposited, through the second-nozzle-body outlet port, between the first part and the second part. The first ultrasonic-sensor roller and the second ultrasonic-sensor roller, being rotatable relative to the support, enables the first ultrasonic-sensor roller and the second ultrasonic-sensor roller to roll along the second part as the end effector moves relative to the first part and the second part. Also, the first ultrasonic-sensor roller, being located between the first nozzle and the second nozzle, and the second ultrasonic-sensor roller, being located between the first ultrasonic-sensor roller and the second nozzle, provides for detection of adhesive between the first part and the second part, by the first ultrasonic-sensor roller and the second ultrasonic-sensor roller, at locations away from the first-nozzle-body outlet port and the second-nozzle-body outlet port, which helps to monitor the spread of the adhesive away from the first-nozzle-body outlet port and the second-nozzle-body outlet port. The first ultrasonic-sensor roller, being translationally fixed relative to the support, and the second ultrasonic-sensor roller, being translationally fixed relative to the support, enables the end effector to have a compact design.

Also disclosed herein is a method of using the end effector for adhesively attaching the first part, which comprises a first-part faying surface, to the second part, which comprises a first second-part faying surface and a second second-part faying surface. The second second-part faying surface is spaced away from the first second-part faying surface. The method comprises moving the first nozzle relative to the support such that the first-nozzle separator plate is inserted between and separates the first-part faying surface and the first second-part faying surface. The method also comprises moving the second nozzle relative to the support such that the second-nozzle separator plate is inserted between and separates the first-part faying surface and the second second-part faying surface. The method further comprises, with the first-nozzle separator plate inserted between and separating the first-part faying surface and the first second-part faying surface, dispensing a first volume of adhesive, in a first direction, from the first-nozzle-body outlet port into a first space, defined between the first-part faying surface and the first second-part faying surface, and detecting presence of the first volume of adhesive between the first-part faying surface and the first second-part faying surface by using the first ultrasonic-sensor roller. A first virtual ray corresponds with the first direction. The method additionally comprises, with the second-nozzle separator plate inserted between and separating the first-part faying surface and the second second-part faying surface, dispensing a second volume of adhesive, in a second direction, from the second-nozzle-body outlet port into a second space, defined between the first-part faying surface and the second second-part faying surface, and detecting the presence of the second volume of adhesive between the first-part faying surface and the second second-part faying surface by using the second ultrasonic-sensor roller. A second virtual ray corresponds with the second direction and the first direction is toward and opposite the second direction.

The method facilitates depositing the adhesive through the first-nozzle-body outlet port and the second-nozzle-body outlet port, into the first space and the second space between the first part and the second part. Inserting the first-nozzle separator plate between the first-part faying surface and the first second-part faying surface acts as a wedge to facilitate separation between the first part and the second part to create the first space. Similarly, inserting the second-nozzle separator plate between the first-part faying surface and the second second-part faying surface promotes separation between the first part and the second part to create the second space. The first-nozzle-body outlet port and the first-nozzle separator plate enable the adhesive to be deposited, through the first-nozzle-body outlet port, into the first space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. Likewise, the second-nozzle-body outlet port and the second-nozzle separator plate enable the adhesive to be deposited, through the second-nozzle-body outlet port, into the second space when the second-nozzle separator plate is located between and is separating the first part and the second part. Accordingly, a configuration of the second-nozzle-body outlet port and the second-nozzle separator plate maintains separation between the first part and the second part as the adhesive is deposited, through the second-nozzle-body outlet port, between the first part and the second part. Detecting the presence of the adhesive between the first-part faying surface and the first second-part faying surface, using the first ultrasonic-sensor roller, and detecting the presence of the adhesive between the first-part faying surface and the second second-part faying surface, using the second ultrasonic-sensor roller, helps to control the spread of dispensed adhesive and to prevent dispensing the adhesive between the non-faying surface of the second part and the first-part faying surface where the adhesive is not needed.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 9A, 9B, and 9C, collectively, are a block diagram of a method, according to one or more examples of the subject matter, disclosed herein, of adhesively attaching a first part to a second part utilizing the end effector of FIG. 1, according to one or more examples of the subject matter, disclosed herein.

DETAILED DESCRIPTION

Figure 1:
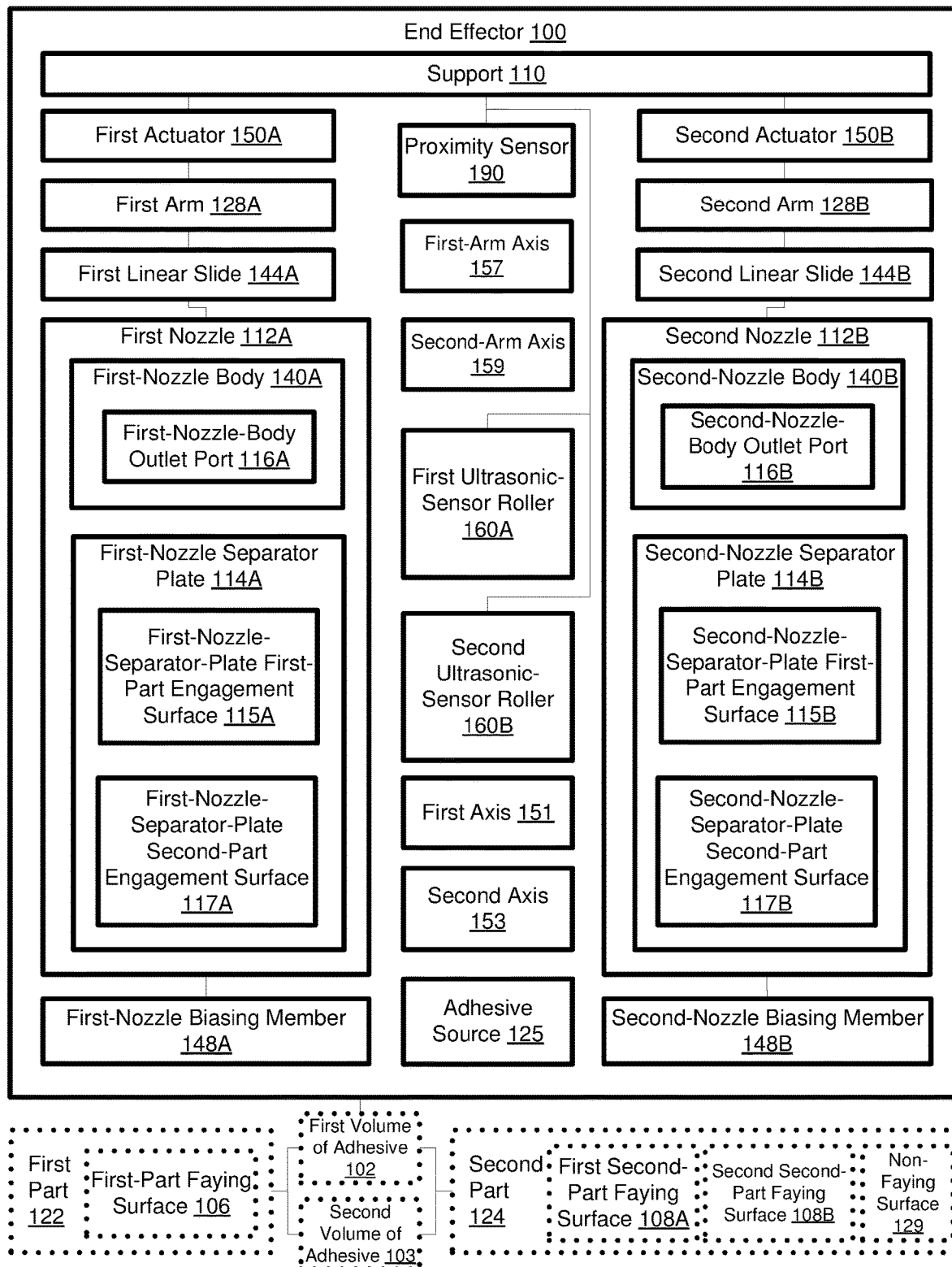
FIG. 1 is a block diagram of an end effector for adhesively attaching a first part to a second part, according to one or more examples of the subject matter, disclosed herein.
Figure 2A:
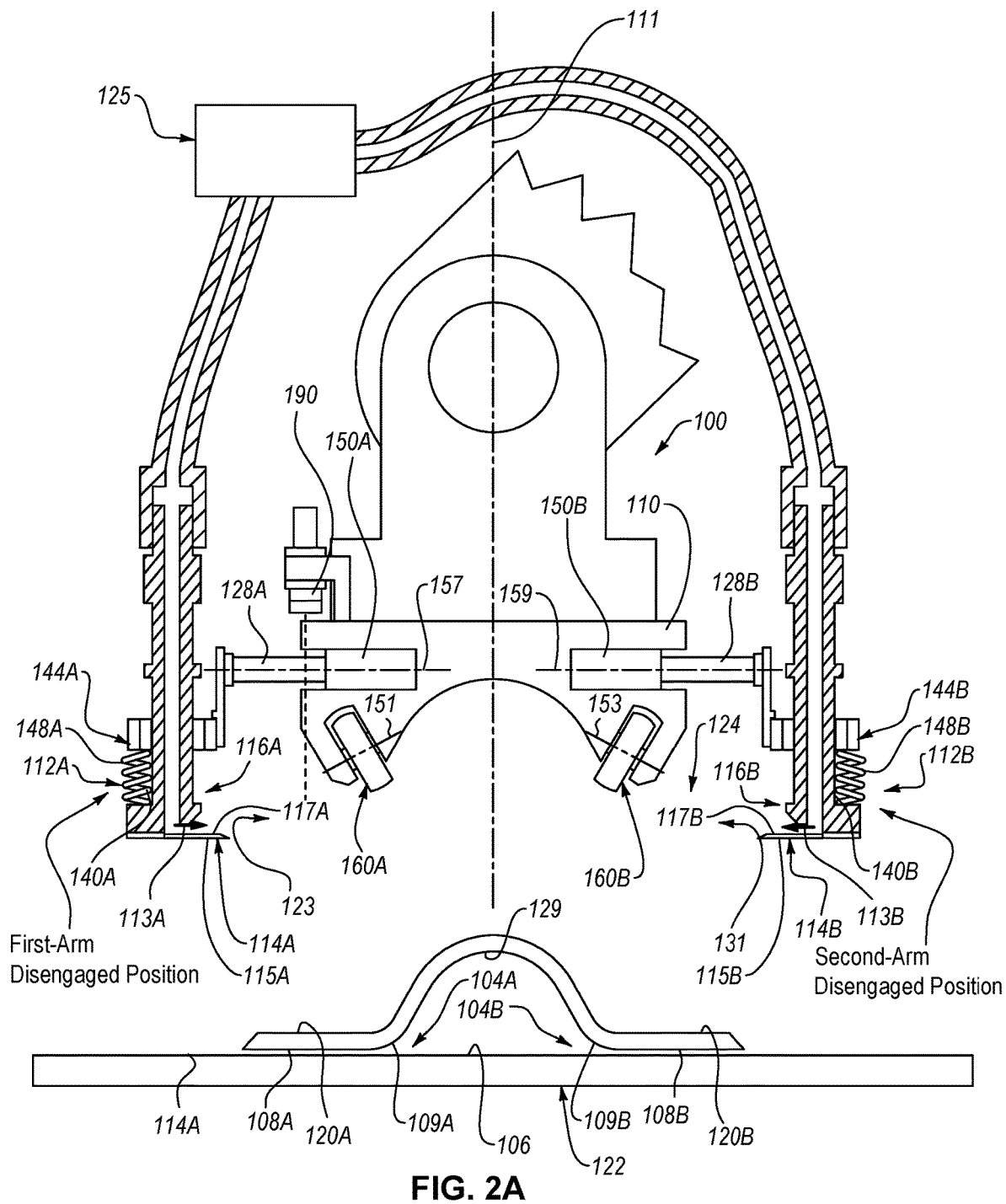
FIG. 2A is a schematic, elevation, sectional view of the end effector of FIG. 1, according to one or more examples of the subject matter, disclosed herein.
Figure 2B:
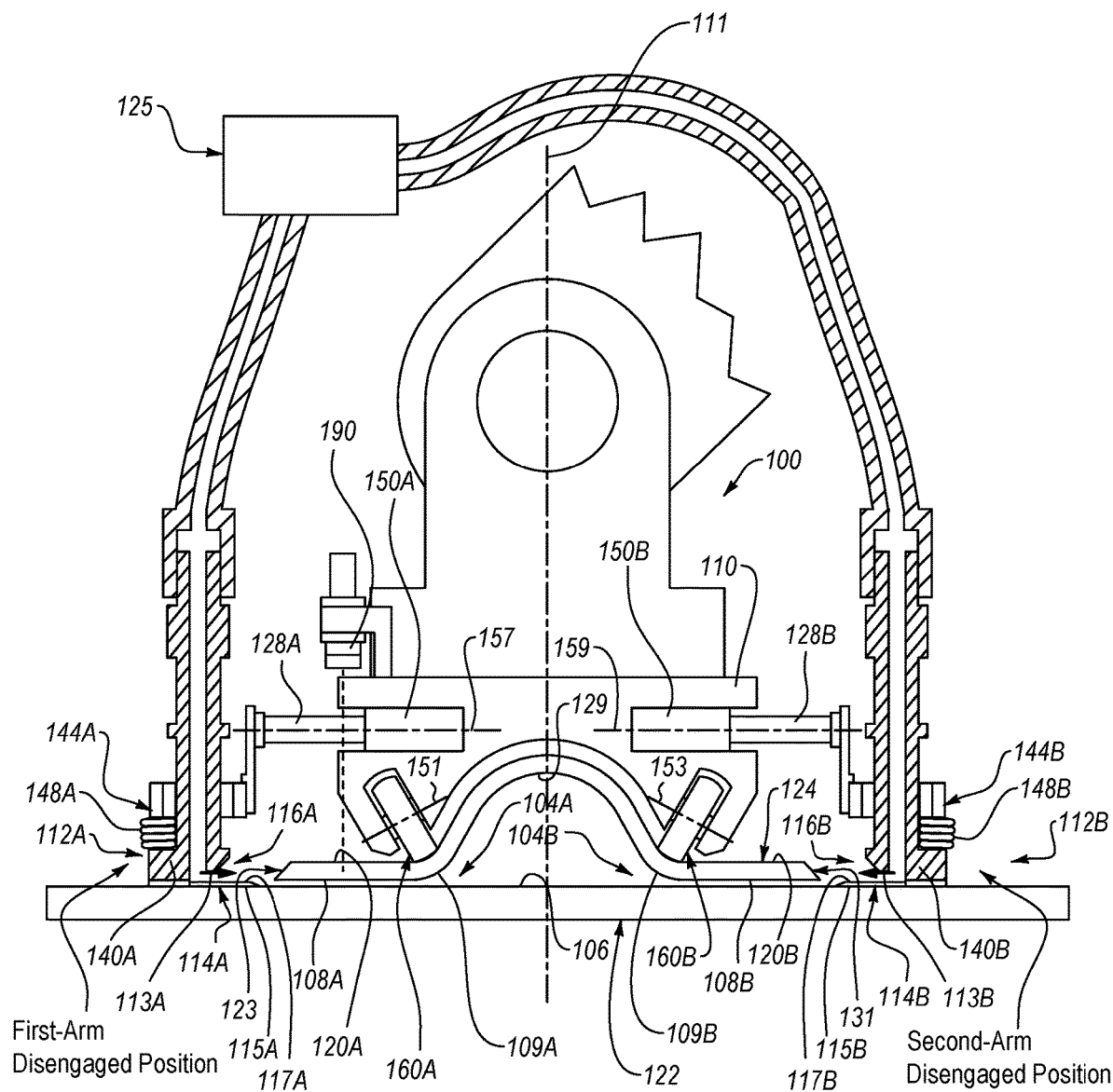
FIG. 2B is a schematic, elevation, sectional view of the end effector of FIG. 1, according to one or more examples of the subject matter, disclosed herein.
Figure 3:
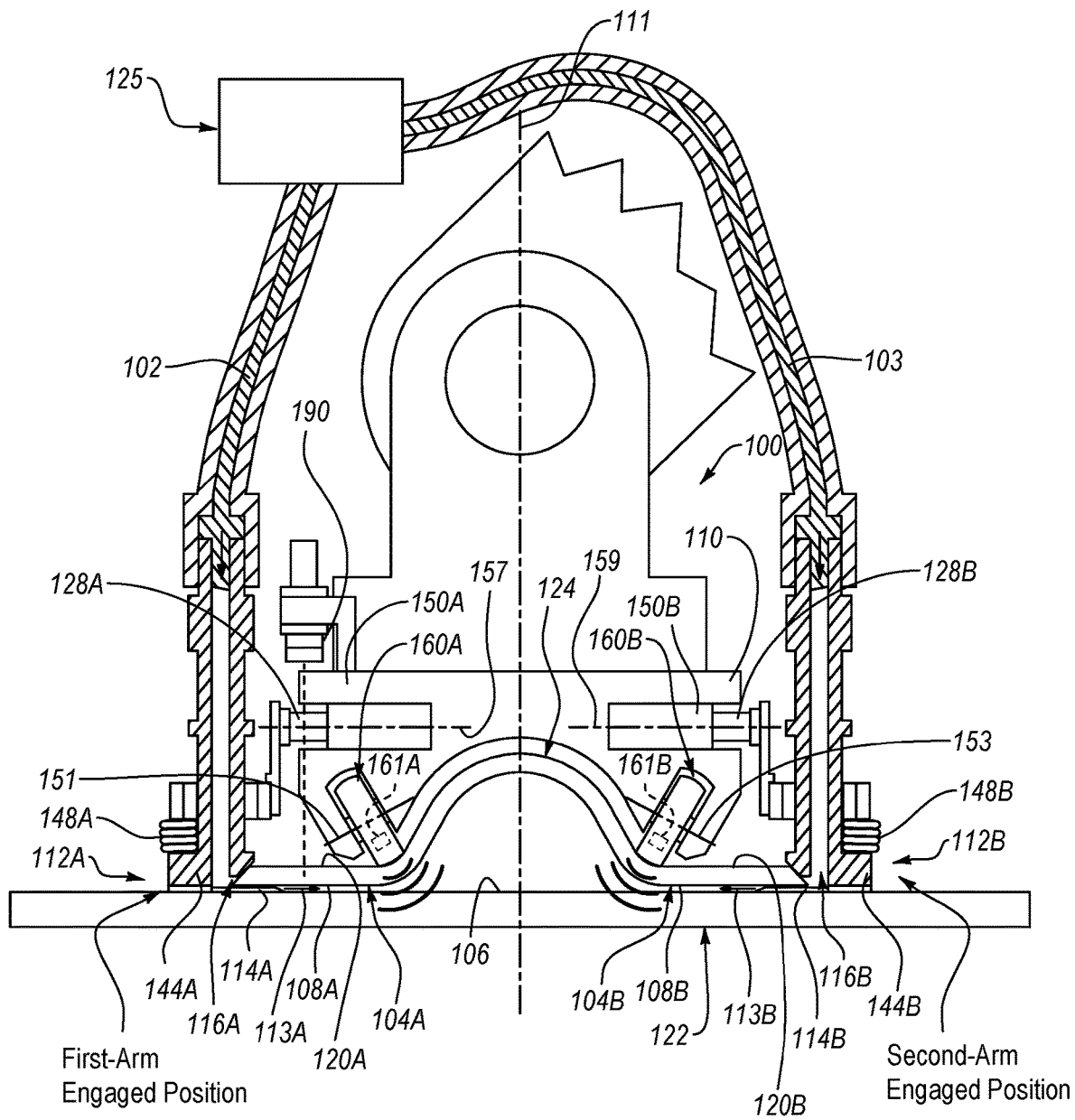
FIG. 3 is a schematic, elevation, sectional view of the end effector of FIG. 1, according to one or more examples of the subject matter, disclosed herein.
Figure 4:
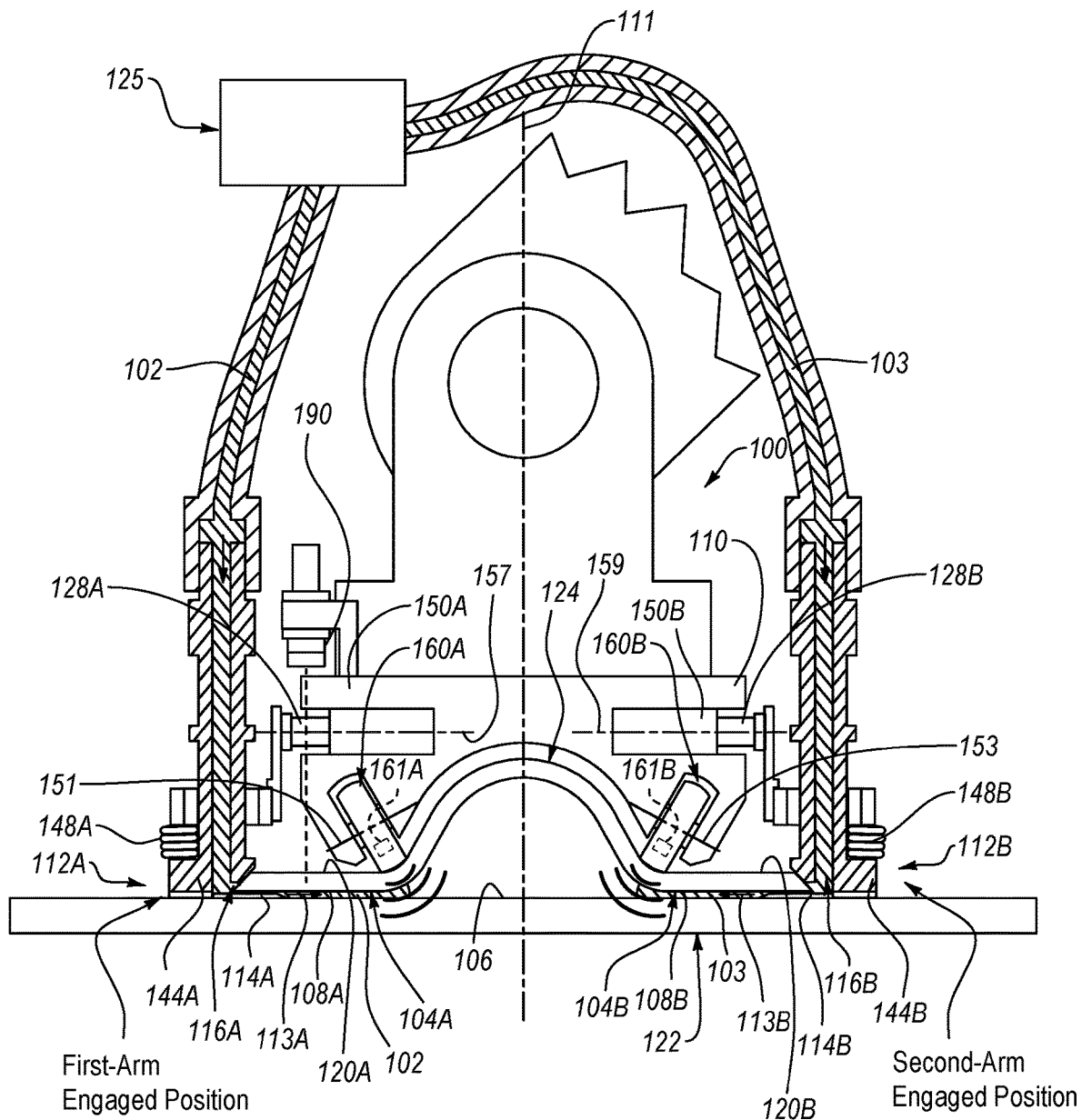
FIG. 4 is a schematic, elevation, sectional view of the end effector of FIG. 1, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 9A:
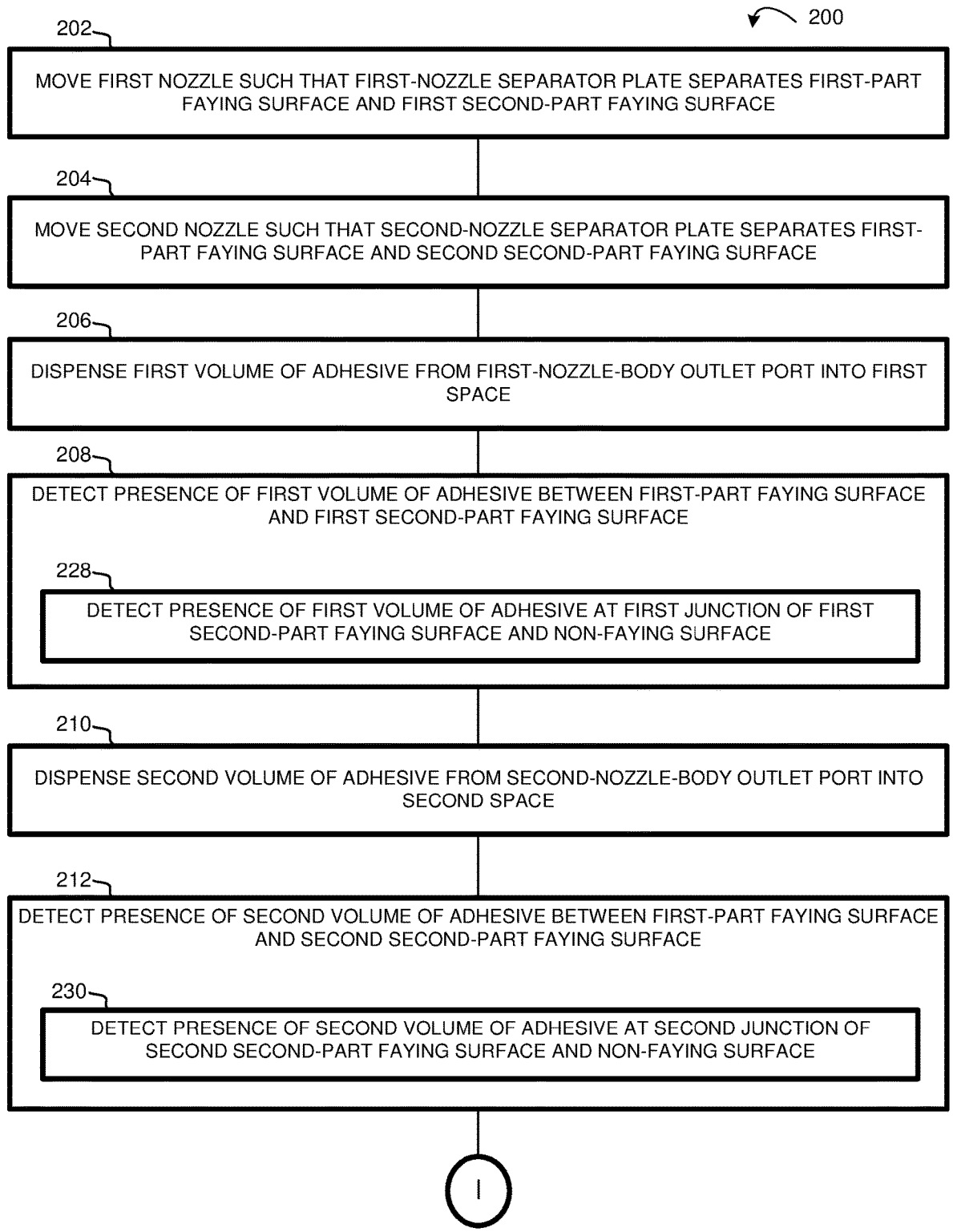
Figure 9B:
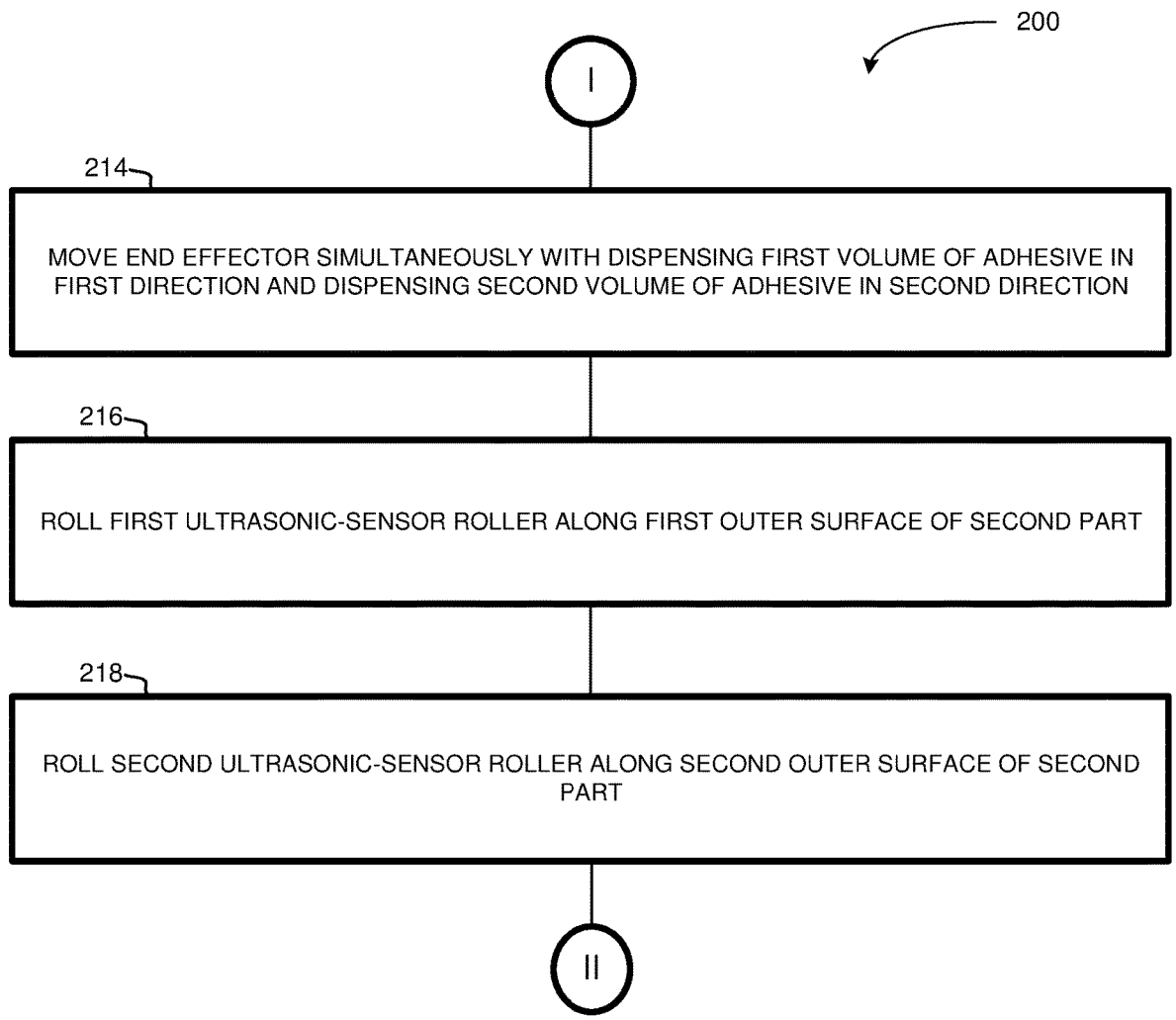

In FIGS. 9A, 9B, and 9C, referred to above, the blocks may represent operations and/or portions thereof and lines connecting the various blocks do not imply any particular order or dependency of the operations or portions thereof.

Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9A, 9B, and 9C and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2A-8 for illustrative purposes only and not by way of limitation, the following portion of this paragraph delineates example 1 of the subject matter, disclosed herein. According to example 1, end effector 100, for adhesively attaching first part 122 to second part 124, comprises support 110 and first nozzle 112A, coupled to support 110 and movable relative to support 110. First nozzle 112A comprises first-nozzle body 140A, comprising first-nozzle-body outlet port 116A. First nozzle 112A also comprises first-nozzle separator plate 114A, extending from first-nozzle body 140A. End effector 100 further comprises second nozzle 112B, coupled to support 110 and movable relative to support 110. Second nozzle 112B comprises second-nozzle body 140B, comprising second-nozzle-body outlet port 116B. Second nozzle 112B also comprises second-nozzle separator plate 114B, extending from second-nozzle body 140B. End effector 100 additionally comprises first ultrasonic-sensor roller 160A that is coupled to support 110 such that first ultrasonic-sensor roller 160A is rotatable relative to support 110 and is translationally fixed relative to support 110. First ultrasonic-sensor roller 160A is located between first nozzle 112A and second nozzle 112B. End effector 100 also comprises second ultrasonic-sensor roller 160B that is coupled to support 110 such that second ultrasonic-sensor roller 160B is rotatable relative to support and is translationally fixed relative to support 110. Second ultrasonic-sensor roller 160B is located between first ultrasonic-sensor roller 160A and second nozzle 112B.

End effector 100 provides for depositing adhesive, through first-nozzle-body outlet port 116A and second-nozzle-body outlet port 116B, into corresponding spaces (e.g., first space 104A and second space 104B) between first part 122 and second part 124. First-nozzle separator plate 114A promotes separation between first part 122 and second part 124 to create first space 104A. Similarly, second-nozzle separator plate 114B promotes separation between first part 122 and second part 124 to create second space 104B. First-nozzle-body outlet port 116A and first-nozzle separator plate 114A enable adhesive to be deposited, through first-nozzle-body outlet port 116A, into first space 104A when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as adhesive is deposited, through first-nozzle-body outlet port 116A, between first part 122 and second part 124. Likewise, second-nozzle-body outlet port 116B and second-nozzle separator plate 114B enable adhesive to be deposited, through second-nozzle-body outlet port 116B, into second space 104B when second-nozzle separator plate 114B is located between and is separating first part 122 and second part 124. Accordingly, a configuration of second-nozzle-body outlet port 116B and second-nozzle separator plate 114B maintains separation between first part 122 and second part 124 as adhesive is deposited, through second-nozzle-body outlet port 116B, between first part 122 and second part 124. First ultrasonic-sensor roller 160A and second ultrasonic-sensor roller 160B, being rotatable relative to support 110, enables first ultrasonic-sensor roller 160A and second ultrasonic-sensor roller 160B to roll along second part 124 as end effector 100 moves relative to first part 122 and second part 124. Also, first ultrasonic-sensor roller 160A, being located between first nozzle 112A and second nozzle 112B, and second ultrasonic-sensor roller 160B, being located between first ultrasonic-sensor roller 160A and second nozzle 112B, provides for detection of adhesive between first part 122 and second part 124, by first ultrasonic-sensor roller 160A and second ultrasonic-sensor roller 160B, at locations away from first-nozzle-body outlet port 116A and second-nozzle-body outlet port 116B, which helps to monitor the spread of adhesive away from first-nozzle-body outlet port 116A and second-nozzle-body outlet port 116B. First ultrasonic-sensor roller 160A, being translationally fixed relative to support 110, and second ultrasonic-sensor roller 160B, being translationally fixed relative to support 110, enables end effector 100 to have a compact design.

Generally, end effector 100 functions as an automated end effector that is operably coupled with an end of a robot (not shown) or other robotic arm mechanism and that is designed to interact with the environment by depositing adhesive between first part 122 and second part 124.

In some examples, first-nozzle separator plate 114A is made of a material that is more flexible than a material of first part 122 and a material of second part 124, which promotes compliancy of first-nozzle separator plate 114A when inserting first-nozzle separator plate 114A between first part 122 and second part 124. Similarly, in some examples, second-nozzle separator plate 114B is made of a material that is more flexible than the material of first part 122 and the material of second part 124, which promotes compliancy of second-nozzle separator plate 114B when inserting second-nozzle separator plate 114B between first part 122 and second part 124.

According to certain examples, each one of first-nozzle separator plate 114A and second-nozzle separator plate 114B includes a beveled tip portion, which promotes ease in inserting first-nozzle separator plate 114A and second-nozzle separator plate 114B between first part 122 and second part 124.

In certain examples, the adhesive (e.g., first volume of adhesive 102 and second volume of adhesive 103) is one of an epoxy adhesive, a polyurethane adhesive, polyamide adhesives, or the like. Moreover, when delivered to and through first-nozzle-body outlet port 116A and second-nozzle-body outlet port 116B, the adhesive is in a flowable state, such as a glutinous, viscous, or extrudable state). After being deposited between first part 122 and second part 124, the adhesive is hardened (e.g., via curing or air drying) to form the adhesive bond between first part 122 and second part 124.

Referring generally to FIG. 1 and particularly to, e.g., FIGS. 2A-4 for illustrative purposes only and not by way of limitation, the following portion of this paragraph delineates example 2 of the subject matter, disclosed herein. According to example 2, which encompasses example 1, above, each of first ultrasonic-sensor roller 160A and second ultrasonic-sensor roller 160B is configured to emit an ultrasonic signal and to detect a reflection of the ultrasonic signal.

First-roller-sensor ultrasonic signal 160A and second-roller-sensor ultrasonic signal 160B enable detection of presence of adhesive, at two different locations, between first part 122 and second part 124. Moreover, the ultrasonic signals, which are depicted by radiating lines in FIGS. 3 and 4, emitted by first ultrasonic-sensor roller 160A and second ultrasonic-sensor roller 160B are configured to penetrate through first part 122 or second part 124, which enables first ultrasonic-sensor roller 160A and second ultrasonic-sensor roller 160B, respectively, to detect the presence of adhesive between first part 122 and second part 124. The ultrasonic signal, emitted by first ultrasonic-sensor roller 160A, is generated by first ultrasonic sensor array 161A, housed within first ultrasonic-sensor roller 160A, and the ultrasonic signal, emitted by second ultrasonic-sensor roller 160B, is generated by second ultrasonic sensor array 161B, housed within second ultrasonic-sensor roller 160B. At least one of first ultrasonic sensor array 161A or second ultrasonic sensor array 161B is an annular ultrasonic sensor, in some examples.

Referring generally to FIG. 1 and particularly to, e.g., FIGS. 2A-4 for illustrative purposes only and not by way of limitation, the following portion of this paragraph delineates example 3 of the subject matter, disclosed herein. According to example 3, which encompasses example 1 or 2, above, first ultrasonic-sensor roller 160A and second ultrasonic-sensor roller 160B are located on opposite sides of virtual plane 111, passing through support 110.

First ultrasonic-sensor roller 160A and second ultrasonic-sensor roller 160B, being located on opposite sides of virtual plane 111, enable first ultrasonic-sensor roller 160A and second ultrasonic-sensor roller 160B to engage and roll along opposite sides of second part 124. In some examples, virtual plane 111 is a virtual symmetry plane of support 110.

Referring generally to FIG. 1 and particularly to, e.g., FIGS. 2A-4 for illustrative purposes only and not by way of limitation, the following portion of this paragraph delineates example 4 of the subject matter, disclosed herein. According to example 4, which encompasses example 3, above, end effector 100 further comprises first arm 128A, which is attached to first nozzle 112A and is coupled to support 110. End effector 100 also comprises second arm 128B, attached to second nozzle 112B and coupled to support 110. First arm 128A is translationally movable relative to support 110, along first-arm axis 157, to one of a first-arm engaged position or a first-arm disengaged position. Second arm 128B is translationally movable relative to support 110, along second-arm axis 159, to one of a second-arm engaged position or a second-arm disengaged position. First-arm axis 157 and second-arm axis 159 are perpendicular to virtual plane 111. First-nozzle separator plate 114A is closer to second-nozzle separator plate 114B when first arm 128A is in the first-arm engaged position and second arm 128B is in the second-arm engaged position than when first arm 128A is in the first-arm disengaged position and second arm 128B is in the second-arm disengaged position.

First arm 128A, being translationally movable relative to support, to one of the first-arm engaged position or the first-arm disengaged position, enables first-nozzle separator plate 114A to be selectively insertable into or retractable out from space between first part 122 and second part 124 independent of movement of support 110. Similarly, second arm 128B, being translationally movable relative to support, to one of the second-arm engaged position or the second-arm disengaged position, enables second-nozzle separator plate 114B to be selectively insertable into or retractable out from space between first part 122 and second part 124 independent of movement of support 110. The movement of first arm 128A and second arm 128B, being translational, promotes co-planarity of first-nozzle separator plate 114A and second-nozzle separator plate 114B with first part 122 as first-nozzle separator plate 114A and second-nozzle separator plate 114B are inserted into or retracted out from space between first part 122 and second part 124. First-nozzle separator plate 114A, being closer to second-nozzle separator plate 114B, when first arm 128A is in the first-arm engaged position and second arm 128B is in the second-arm engaged position than when first arm 128A is in the first-arm disengaged position and second arm 128B is in the second-arm disengaged position, provides end effector 100 with more freedom for maneuvering relative to first part 122 and second part 124 as end effector 100 approaches first part 122 and second part 124 to dispense adhesive between first part 122 and second part 124 and as end effector 100 is moved away from first part 122 and second part 124 after adhesive has been dispensed between first part 122 and second part 124.

In some examples, the subject matter, disclosed herein, includes axes, planes, and rays. Such axes, planes, and rays, unless otherwise indicated, are virtual (imaginary) features, used to define certain aspects of the subject matter. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities can be defined.

Referring generally to FIG. 1 and particularly to, e.g., FIGS. 2A-4 for illustrative purposes only and not by way of limitation, the following portion of this paragraph delineates example 5 of the subject matter, disclosed herein. According to example 5, which encompasses example 4, above, first nozzle 112A is translationally movable relative to first ultrasonic-sensor roller 160A along first-arm axis 157. First nozzle 112A is translationally movable relative to first arm 128A in a direction, perpendicular to first-arm axis 157. Second nozzle 112B is translationally movable relative to second ultrasonic-sensor roller 160B along second-arm axis 159. Second nozzle 112B is translationally movable relative to second arm 128B in a direction, perpendicular to second-arm axis 159.

First nozzle 112A, being translationally movable relative to first ultrasonic-sensor roller 160A, and second nozzle 112B, being translationally movable relative to second ultrasonic-sensor roller 160B, enables first-nozzle separator plate 114A and second-nozzle separator plate 114B to be inserted into or retracted out from the space between first part 122 and second part 124 while first ultrasonic-sensor roller 160A and second ultrasonic-sensor roller 160B are engaged with second part 124, which helps to keep second part 124 properly positioned as first-nozzle separator plate 114A and second-nozzle separator plate 114B are inserted into or retracted out from the space between first part 122 and second part 124. First nozzle 112A, being translationally movable relative to first arm 128A in the direction, perpendicular to first-arm axis 157 and second nozzle 112B, being translationally movable relative to second arm 128B in the direction, perpendicular to second-arm axis 159 helps to reduce the impact of first-nozzle separator plate 114A and second-nozzle separator plate 114B with first part 122, and accommodates for irregularities in second part 124, as first-nozzle separator plate 114A and second-nozzle separator plate 114B are brought into contact with first part 122 by end effector 100.

Referring generally to FIG. 1 and particularly to, e.g., FIGS. 2A-4 for illustrative purposes only and not by way of limitation, the following portion of this paragraph delineates example 6 of the subject matter, disclosed herein. According to example 6, which encompasses example 5, above, end effector 100 further comprises first-nozzle biasing member 148A, coupled to first arm 128A, and second-nozzle biasing member 148B, coupled to second arm 128B. First-nozzle biasing member 148A is configured to bias first nozzle 112A such that first-nozzle separator plate 114A is biased away from first-arm axis 157. Second-nozzle biasing member 148B is configured to bias second nozzle 112B such that second-nozzle separator plate 114B is biased away from second-arm axis 159.

First-nozzle biasing member 148A, being configured to bias first nozzle 112A such that first-nozzle separator plate 114A is biased away from first-arm axis 157, and second-nozzle biasing member 148B, being configured to bias second nozzle 112B such that second-nozzle separator plate 114B is biased away from second-arm axis 159, promotes constant engagement of first-nozzle separator plate 114A and second-nozzle separator plate 114B, respectively, with first part 122, as end effector 100 moves relative to first part 122 and second part 124, and as adhesive is dispensed through first-nozzle-body outlet port 116A and second-nozzle-body outlet port 116B. In some examples, when engaged with first part 122, first-nozzle separator plate 114A and second-nozzle separator plate 114B are flush against first part 122.

As used herein, "to bias" means to continuously apply a force, which may or may not have a constant magnitude, but is always applied in the same direction and has a magnitude greater than zero.

Referring generally to FIG. 1 and particularly to, e.g., FIGS. 2A-4 for illustrative purposes only and not by way of limitation, the following portion of this paragraph delineates example 7 of the subject matter, disclosed herein. According to example 7, which encompasses example 6, above, first-nozzle biasing member 148A is a compression spring, coupled to first nozzle 112A and to first arm 128A. Second-nozzle biasing member 148B is a compression spring, coupled to second nozzle 112B and to second arm 128B.

First-nozzle biasing member 148A, being coupled to first nozzle 112A, enables first nozzle 112A to be biased relative to first arm 128A, which helps in achieving a controlled initial engagement between first-nozzle separator plate 114A and first part 122, and helps to keep first-nozzle separator plate 114A in contact with first part 122 as adhesive is being dispensed. Similarly, second-nozzle biasing member 148B, being coupled to second nozzle 112B, enables second nozzle 112B to be biased relative to second arm 128B, which helps in achieving a controlled initial engagement between second-nozzle separator plate 114B and first part 122, and helps to keep second-nozzle separator plate 114B in contact with first part 122 as adhesive is being dispensed. Compression springs provide a simple, predictable, and reliable means for biasing first nozzle 112A and second nozzle 112B relative to first arm 128A and second arms 128B, respectively. Additionally, compression springs reduce complexity and reduce spatial constraints by moving spring connection points away from first-nozzle-body outlet port 116A and second-nozzle-body outlet port 116B. However, in some examples, each one of first-nozzle biasing member 148A and second-nozzle biasing member 148B is a different type of biasing member, such as a tension spring.

Referring generally to FIG. 1 and particularly to, e.g., FIGS. 2A-4 for illustrative purposes only and not by way of limitation, the following portion of this paragraph delineates example 8 of the subject matter, disclosed herein. According to example 8, which encompasses any one of examples 4 to 7, above, first-arm axis 157 is co-linear with second-arm axis 159.

First-arm axis 157, being co-linear with second-arm axis 159, promotes a consistent and non-staggered insertion of first-nozzle separator plate 114A and second-nozzle separator plate 114B into corresponding spaces between first part 122 and second part 124.

Referring generally to FIG. 1 and particularly to, e.g., FIGS. 2A-4 for illustrative purposes only and not by way of limitation, the following portion of this paragraph delineates example 9 of the subject matter, disclosed herein. According to example 9, which encompasses any one of examples 4 to 8, above, first ultrasonic-sensor roller 160A is rotatable about first axis 151. Second ultrasonic-sensor roller 160B is rotatable about second axis 153. First axis 151 is oblique relative to first-arm axis 157. Second axis 153 is oblique relative to second-arm axis 159.

First axis 151 being oblique relative to first-arm axis 157, and second axis 153 being oblique relative to second-arm axis 159, promotes engagement of first ultrasonic-sensor roller 160A and second ultrasonic-sensor roller 160B with second part 124, such as corresponding radiused portions of second part 124. Additionally, first axis 151 being oblique relative to first-arm axis 157, and second axis 153 being oblique relative to second-arm axis 159, enables first ultrasonic-sensor roller 160A and second ultrasonic-sensor roller 160B to be in a proper position for accurately and precisely determining presence of adhesive in corresponding spaces between first part 122 and second part 124.

Referring generally to FIG. 1 and particularly to, e.g., FIGS. 2A-4 for illustrative purposes only and not by way of limitation, the following portion of this paragraph delineates example 10 of the subject matter, disclosed herein. According to example 10, which encompasses any one of examples 4 to 9, above, first-nozzle-body outlet port 116A is open in a first direction. Second-nozzle-body outlet port 116B is open in a second direction. When first arm 128A is in the first-arm engaged position, and when second arm 128B is in the second-arm engaged position, first nozzle 112A and second nozzle 112B are oriented relative to each other such that first virtual ray 113A, corresponding with the first direction, is directed toward and is co-linear with second virtual ray 113B, corresponding with the second direction.

Orienting first nozzle 112A and second nozzle 112B relative to each other, such that first virtual ray 113A is directed toward and is co-linear with second virtual ray 113B, promotes a uniform or non-staggered distribution of adhesive between first part 122 and second part 124 on opposite sides of second part 124.

Figure 5A:
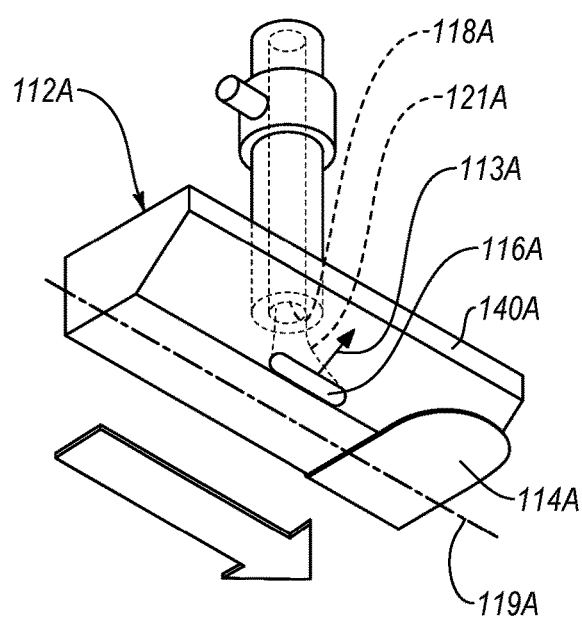
FIG. 5A is a schematic, perspective view of a first nozzle of the apparatus of FIG. 1, according to one or more examples of the subject matter, disclosed herein.
Figure 5B:
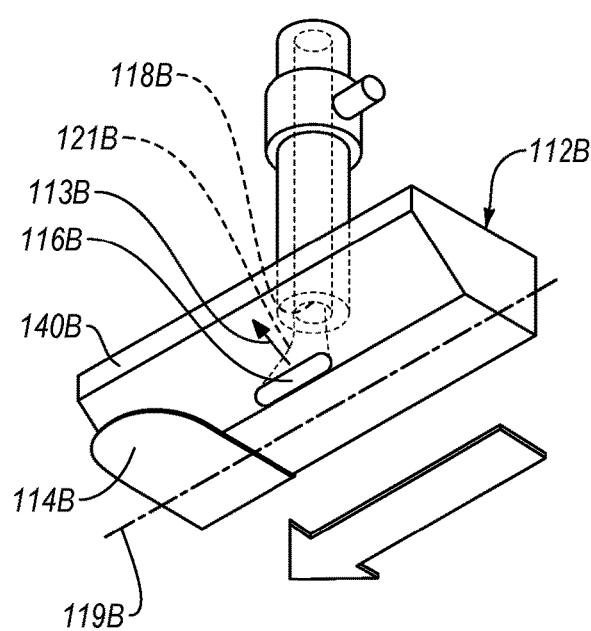
FIG. 5B is a schematic, perspective view of a second nozzle of the apparatus of FIG. 1, according to one or more examples of the subject matter, disclosed herein.

In some examples, first nozzle 112A and second nozzle 112B are selectively fluidically coupled with a source of adhesive (e.g., adhesive source 125) via respective tubes, which are flexible, in some examples. Flexible tubes enable first nozzle 112A and second nozzle 112B to move relative to the source of adhesive. Adhesive source 125 enables adhesive to be dispensed from first-nozzle-body outlet port 116A and second-nozzle-body outlet port 116B. Referring to FIG. 5A, first-nozzle body 140A further comprises first-nozzle-body inlet port 118A and first-nozzle-body channel 121A. First-nozzle-body channel 121A extends through first-nozzle body 140A and fluidically couples together first-nozzle-body inlet port 118A and first-nozzle-body outlet port 116A, such that adhesive 102 from adhesive source 125 flows into first-nozzle-body inlet port 118A, through first-nozzle-body channel 121A, and to first-nozzle-body outlet port 116A. Referring to FIG. 5B, second-nozzle body 140B further comprises second-nozzle-body inlet port 118B and second-nozzle-body channel 121B. Second-nozzle-body channel 121B extends through second-nozzle body 140B and fluidically couples together second-nozzle-body inlet port 118B and second-nozzle-body outlet port 116B, such that adhesive 102 from adhesive source 125 flows into second-nozzle-body inlet port 118B, through second-nozzle-body channel 121B, and to second-nozzle-body outlet port 116B. Although shown as a single unit in FIGS. 2A-4, in one or more examples, adhesive source 125 includes multiple units, such that first nozzle 112A is considered to be fluidically coupled to one positive-pressure source, and second nozzle 112B is considered to be fluidically coupled to another positive-pressure source. Adhesive source 125 is a pump, in certain examples.

Referring generally to FIG. 1 and particularly to, e.g., FIGS. 2A-4 for illustrative purposes only and not by way of limitation, the following portion of this paragraph delineates example 11 of the subject matter, disclosed herein. According to example 11, which encompasses any one of examples 4 to 10, above, first-nozzle separator plate 114A comprises first-nozzle-separator-plate first-part engagement surface 115A and first-nozzle-separator-plate second-part engagement surface 117A. First-nozzle-separator-plate first-part engagement surface 115A and first-nozzle-separator-plate second-part engagement surface 117A are parallel to each other. Second-nozzle separator plate 114B comprises second-nozzle-separator-plate first-part engagement surface 115B and second-nozzle-separator-plate second-part engagement surface 117B. Second-nozzle-separator-plate first-part engagement surface 115B and second-nozzle-separator-plate second-part engagement surface 117B are parallel to each other. When first arm 128A is in the first-arm disengaged position, and second arm 128B is in the second-arm disengaged position, first-nozzle-separator-plate first-part engagement surface 115A and second-nozzle-separator-plate first-part engagement surface 115B are coplanar. When first arm 128A is in the first-arm engaged position, and second arm 128B is in the second-arm engaged position, first-nozzle-separator-plate first-part engagement surface 115A and second-nozzle-separator-plate first-part engagement surface 115B are coplanar.

First-nozzle-separator-plate first-part engagement surface 115A and second-nozzle-separator-plate first-part engagement surface 115B, being-coplanar when first arm 128A is in the first-arm engaged position and the first-arm disengaged position, and second arm 128B is in the second-arm engaged position and the second-arm disengaged position, promotes insertion of first-nozzle separator plate 114A and second-nozzle separator plate 114B into corresponding spaces between first part 122 and second part 124 by reducing binding of first-nozzle separator plate 114A and second-nozzle separator plate 114B.

Referring generally to FIG. 1 and particularly to, e.g., FIGS. 2A-4 for illustrative purposes only and not by way of limitation, the following portion of this paragraph delineates example 12 of the subject matter, disclosed herein. According to example 12, which encompasses any one of examples 4 to 11, above, when first arm 128A is in the first-arm engaged position, and second arm 128B is in the second-arm engaged position, a minimum distance between first-nozzle separator plate 114A and second-nozzle separator plate 114B is less than a minimum distance between first-nozzle-body outlet port 116A and second-nozzle-body outlet port 116B, and a minimum distance between first ultrasonic-sensor roller 160A and second ultrasonic-sensor roller 160B is less than the minimum distance between first-nozzle separator plate 114A and second-nozzle separator plate 114B.

The minimum distance between first-nozzle separator plate 114A and second-nozzle separator plate 114B, being less than the minimum distance between first-nozzle-body outlet port 116A and second-nozzle-body outlet port 116B, enables first-nozzle separator plate 114A and second-nozzle separator plate 114B to be positioned between first part 122 and second part 124 when first-nozzle-body outlet port 116A and second-nozzle-body outlet port 116B are in position to dispense adhesive between first part 122 and second part 124, which promotes separation of second part 124 from first part 122 by first-nozzle separator plate 114A and second-nozzle separator plate 114B before adhesive is dispensed. Additionally, the minimum distance between first ultrasonic-sensor roller 160A and second ultrasonic-sensor roller 160B, being less than the minimum distance between first-nozzle separator plate 114A and second-nozzle separator plate 114B, enables first ultrasonic-sensor roller 160A and second ultrasonic-sensor roller 160B to detect adhesive at locations beyond first-nozzle separator plate 114A and second-nozzle separator plate 114B.

Referring generally to FIG. 1 and particularly to, e.g., FIGS. 2A-8 for illustrative purposes only and not by way of limitation, the following portion of this paragraph delineates example 13 of the subject matter, disclosed herein. According to example 13, which encompasses any one of examples 4 to 9, above, first-nozzle-body outlet port 116A is open in a first direction. First-nozzle separator plate 114A extends from first-nozzle body 140A in the first direction. Second-nozzle-body outlet port 116B is open in a second direction. Second-nozzle separator plate 114B extends from second-nozzle body 140B in the second direction. When first arm 128A is in the first-arm engaged position, and second arm 128B is in the second-arm engaged position, first nozzle 112A and second nozzle 112B are oriented relative to each other such that first virtual ray 113A, corresponding with the first direction, and second virtual ray 113B, corresponding with the second direction, are co-planar.

Orienting first nozzle 112A and second nozzle 112B relative to each other such that first virtual ray 113A and second virtual ray 113B are co-planar enables the distribution of adhesive between first part 122 and second part 124 on opposite sides of second part 124 to be uniform or non-uniform, or staggered or non-staggered.

Referring generally to FIG. 1 and particularly to, e.g., FIGS. 2A-4 for illustrative purposes only and not by way of limitation, the following portion of this paragraph delineates example 14 of the subject matter, disclosed herein. According to example 14, which encompasses example 13, above, first ultrasonic-sensor roller 160A is rotatable about first axis 151. Second ultrasonic-sensor roller 160B is rotatable about second axis 153. First axis 151 is oblique relative to first virtual ray 113A, which corresponds with the first direction. Second axis 153 is oblique relative to second virtual ray 113B, which corresponds with the second direction.

First axis 151, being oblique relative to first virtual ray 113A, and second axis 153, being oblique relative to second virtual ray 113B, promotes engagement of first ultrasonic-sensor roller 160A and second ultrasonic-sensor roller 160B with second part 124, such as corresponding radiused portions of second part 124. Additionally, first axis 151, being oblique relative to first virtual ray 113A, and second axis 153, being oblique relative to second virtual ray 113B, enables first ultrasonic-sensor roller 160A and second ultrasonic-sensor roller 160B to be in a proper position for accurately and precisely determining presence of adhesive in corresponding spaces between first part 122 and second part 124.

Referring generally to FIG. 1 and particularly to, e.g., FIGS. 2A-4 for illustrative purposes only and not by way of limitation, the following portion of this paragraph delineates example 15 of the subject matter, disclosed herein. According to example 15, which encompasses any one of examples 4 to 14, above, end effector 100 further comprises first linear slide 144A, which couples first nozzle 112A to first arm 128A such that first nozzle 112A is translatable relative to first arm 128A. End effector 100 additionally comprises second linear slide 144B, which couples second nozzle 112B to second arm 128B such that second nozzle 112B is translatable relative to second arm 128B.

First linear slide 144A enables and ensures only linear movement of first nozzle 112A relative to first arm 128A, and second linear slide 144B enables and ensures only linear movement of second nozzle 112B relative to second arm 128B. Each one of first linear slide 144A and second linear slide 144B is a component, such as linear-motion bearings, that provides for smooth and low-friction motion along a single axis. In some examples, end effector 100 additionally includes a first gimbal, coupled to first arm 128A and to which first linear slide 144A is coupled, and a second gimbal, coupled to second arm 128B and to which second linear slide 144B is coupled. First gimbal and second gimbal facilitate movement of first linear slide 144A and second linear slide 144B, respectively, about multiple axes, which helps to orient first nozzle 112A and second nozzle 112B relative to first part 122 as first arm 128A and second arm 128B are pivoted into the first-arm disengaged position and the second-arm disengaged position, respectively.

Referring generally to FIG. 1 and particularly to, e.g., FIGS. 2A-4 for illustrative purposes only and not by way of limitation, the following portion of this paragraph delineates example 16 of the subject matter, disclosed herein. According to example 16, which encompasses any one of examples 4 to 15, above, end effector 100 further comprises first actuator 150A, coupled to support 110 and to first arm 128A. First actuator 150A is selectively actuatable such that first arm 128A translationally moves to one of the first-arm engaged position or the first-arm disengaged position. End effector 100 also comprises second actuator 150B, coupled to support 110 and second arm 128B. Second actuator 150B is selectively actuatable such that second arm 128B translationally moves to one of the second-arm engaged position or the second-arm disengaged position.

First actuator 150A and second actuator 150B enable selective translational movement of first arm 128A and second arm 128B, respectively. In some examples, each one of first actuator 150A and second actuator 150B is a selectively controllable actuator powered by one or more of hydraulic power, electric power, electromagnetic power, pneumatic power, and the like.

Referring generally to FIG. 1 and particularly to, e.g., FIGS. 2A-8 for illustrative purposes only and not by way of limitation, the following portion of this paragraph delineates example 17 of the subject matter, disclosed herein. According to example 17, which encompasses any one of examples 1 to 9, above, first-nozzle-body outlet port 116A is open in a first direction. Second-nozzle-body outlet port 116B is open in a second direction. First-nozzle separator plate 114A extends from first-nozzle body 140A in the first direction. Second-nozzle separator plate 114B extends from second-nozzle body 140B in the second direction. First-nozzle separator plate 114A is offset from first-nozzle-body outlet port 116A along first-nozzle-body axis 119A that is perpendicular to first virtual ray 113A, which corresponds to the first direction. Second-nozzle separator plate 114B is offset from second-nozzle-body outlet port 116B along second-nozzle-body axis 119B that is perpendicular to second virtual ray 113B, which corresponds to the second direction.

First-nozzle separator plate 114A, being offset from first-nozzle-body outlet port 116A along first-nozzle-body axis 119A, enables first-nozzle-body outlet port 116A to trail first-nozzle separator plate 114A as end effector 100 moves relative to first part 122 and second part 124 (e.g., in the direction indicated by a directional arrow in FIGS. 5A-8), and as adhesive is dispensed from first-nozzle-body outlet port 116A between first part 122 and second part 124. Similarly, second-nozzle separator plate 114B, being offset from second-nozzle-body outlet port 116B along second-nozzle-body axis 119B, enables second-nozzle-body outlet port 116B to trail second-nozzle separator plate 114B as end effector 100 moves relative to first part 122 and second part 124 (e.g., in the direction indicated by a directional arrow in FIGS. 5A-8), and as adhesive is dispensed between first part 122 and second part 124 through second-nozzle-body outlet port 116B.

Referring generally to FIG. 1 and particularly to, e.g., FIGS. 2A-4 for illustrative purposes only and not by way of limitation, the following portion of this paragraph delineates example 18 of the subject matter, disclosed herein. According to example 18, which encompasses any one of examples 1 to 17, above, end effector 100 further comprises proximity sensor 190, which is coupled to support 110 and is configured to emit an electromagnetic field and detect changes in the electromagnetic field.

Proximity sensor 190 provides for the determination of the distance of end effector 100 from one or both of first part 122 and second part 124, which helps end effector 100 to be moved into a proper position relative to first part 122 and second part 124 for dispensing adhesive between first part 122 and second part 124, and to avoid damaging first part 122 or second part 124, inadvertently impacting first part 122 or second part 124 with end effector 100, as end effector 100 is moved toward first part 122 and second part 124 in preparation for an adhesive-dispensing operation.

Referring generally to FIGS. 9A, 9B, and 9C and particularly to, e.g., FIGS. 2A-8 for illustrative purposes only and not by way of limitation, the following portion of this paragraph delineates example 19 of the subject matter, disclosed herein. According to example 19, disclosed herein is method 200 of using end effector 100 of example 1 for adhesively attaching first part 122, which comprises first-part faying surface 106, to second part 124, which comprises first second-part faying surface 108A and second second-part faying surface 108B, spaced away from first second-part faying surface 108A. Method 200 comprises (block 202) moving first nozzle 112A relative to support 110 such that first-nozzle separator plate 114A is inserted between and separates first-part faying surface 106 and first second-part faying surface 108A. Method 200 also comprises (block 204) moving second nozzle 112B relative to support 110 such that second-nozzle separator plate 114B is inserted between and separates first-part faying surface 106 and second second-part faying surface 108B. Method 200 further comprises (block 206), with first-nozzle separator plate 114A inserted between and separating first-part faying surface 106 and first second-part faying surface 108A, dispensing first volume of adhesive 102, in a first direction, from first-nozzle-body outlet port 116A into first space 104A, defined between first-part faying surface 106 and first second-part faying surface 108A. First virtual ray 113A corresponds with the first direction. Method 200 also comprises (block 208), with first-nozzle separator plate 114A inserted between and separating first-part faying surface 106 and first second-part faying surface 108A, detecting presence of first volume of adhesive 102 between first-part faying surface 106 and first second-part faying surface 108A by using first ultrasonic-sensor roller 160A. Method 200 additionally comprises (block 210), with second-nozzle separator plate 114B inserted between and separating first-part faying surface 106 and second second-part faying surface 108B, dispensing second volume of adhesive 103, in a second direction, from second-nozzle-body outlet port 116B into second space 104B, defined between first-part faying surface 106 and second second-part faying surface 108B. Second virtual ray 113B corresponds with the second direction. The first direction is toward and opposite the second direction. Method 200 also comprises (block 212), with second-nozzle separator plate 114B inserted between and separating first-part faying surface 106 and second second-part faying surface 108B, detecting the presence of second volume of adhesive 103 between first-part faying surface 106 and second second-part faying surface 108B by using second ultrasonic-sensor roller 160B.

Method 200 facilitates depositing adhesive through first-nozzle-body outlet port 116A and second-nozzle-body outlet port 116B, into first space 104A and second space 104B between first part 122 and second part 124. Inserting first-nozzle separator plate 114A, which acts as a wedge, between first-part faying surface 106 and first second-part faying surface 108A facilitates separation between first part 122 and second part 124 to create first space 104A. Similarly, inserting second-nozzle separator plate 114B, which acts as a wedge, between first-part faying surface 106 and second second-part faying surface 108B promotes separation between first part 122 and second part 124 to create second space 104B. First-nozzle-body outlet port 116A and first-nozzle separator plate 114A enable first volume of adhesive to be deposited, through first-nozzle-body outlet port 116A, into first space 104A when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as first volume of adhesive is deposited, through first-nozzle-body outlet port 116A, between first part 122 and second part 124. Likewise, second-nozzle-body outlet port 116B and second-nozzle separator plate 114B enable second volume of adhesive 103 to be deposited, through second-nozzle-body outlet port 116B, into second space 104B when second-nozzle separator plate 114B is located between and is separating first part 122 and second part 124. Accordingly, a configuration of second-nozzle-body outlet port 116B and second-nozzle separator plate 114B maintains separation between first part 122 and second part 124 as second volume of adhesive 103 is deposited, through second-nozzle-body outlet port 116B, between first part 122 and second part 124. Detecting the presence of first volume of adhesive 102 and second volume of adhesive 103 between first-part faying surface 106 and first second-part faying surface 108A, using first ultrasonic-sensor roller 160A, and between first-part faying surface 106 and second second-part faying surface 108B, using second ultrasonic-sensor roller 160B, respectively, helps to control the spread of dispensed adhesive and to prevent dispensing adhesive between non-faying surface 129 of second part 124 and first-part faying surface 106 where adhesive is not needed.

In some examples, second part 124 is a hat stringer. Accordingly, second part 124 includes elongated flanges (e.g., elongated into the page, as shown in FIGS. 2A-4) and an elongated hat portion (e.g., elongated into the page, as shown in FIGS. 2A-4) interposed between the elongated flanges. One of the elongated flanges, at first side 123 of second part 124, defines first second-part faying surface 108A and first outer surface 120A, which faces a direction, opposite that of first second-part faying surface 108A. The other one of the elongated flanges, at second side 131 of second part 124, defines second second-part faying surface 108B and second outer surface 120B, which faces a direction, opposite that of second second-part faying surface 108B. First second-part faying surface 108A is designed to be adhesively bonded to first-part faying surface 106 and second second-part faying surface 108B is designed to be adhesively bonded to first-part faying surface 106. However, non-faying surface 129 of second part 124, being defined by the elongated hat portion of second part 124 and designed to stand off from the first-part faying surface 106, is not designed to be adhesively bonded to first-part faying surface 106. Accordingly, because adhesive between non-faying surface 129 and first-part faying surface 106 is not necessary to adhesively bond second part 124 to first part 122, and would only add unnecessary weight and material cost, desirably, for adhesively bonding second part 124 to first part 122, adhesive is deposited only between first second-part faying surface 108A and first-part faying surface 106 and between second second-part faying surface 108B and first-part faying surface 106.

Referring generally to FIGS. 9A, 9B, and 9C and particularly to, e.g., FIGS. 2A-8 for illustrative purposes only and not by way of limitation, the following portion of this paragraph delineates example 20 of the subject matter, disclosed herein. According to example 20, which encompasses example 19, above, method 200 further comprises (block 214) translationally moving end effector 100 relative to first part 122 and second part 124, perpendicular to first virtual ray 113A and second virtual ray 113B, simultaneously with (block 206) dispensing first volume of adhesive 102 in the first direction and (block 210) dispensing second volume of adhesive 102 in the second direction.

Moving end effector 100, perpendicular to first virtual ray 113A and second virtual ray 113B, simultaneously with dispensing first volume of adhesive 102 in the first direction and dispensing second volume of adhesive 103 in the second direction enables continuous, uniform, and controlled deposition of adhesive between first part 122 and second part 124 along a dimension (e.g., length) of first part 122 and second part 124. End effector 100 is moved along translational-movement axis 127, which is perpendicular to the first direction and the second direction.

Figure 6:
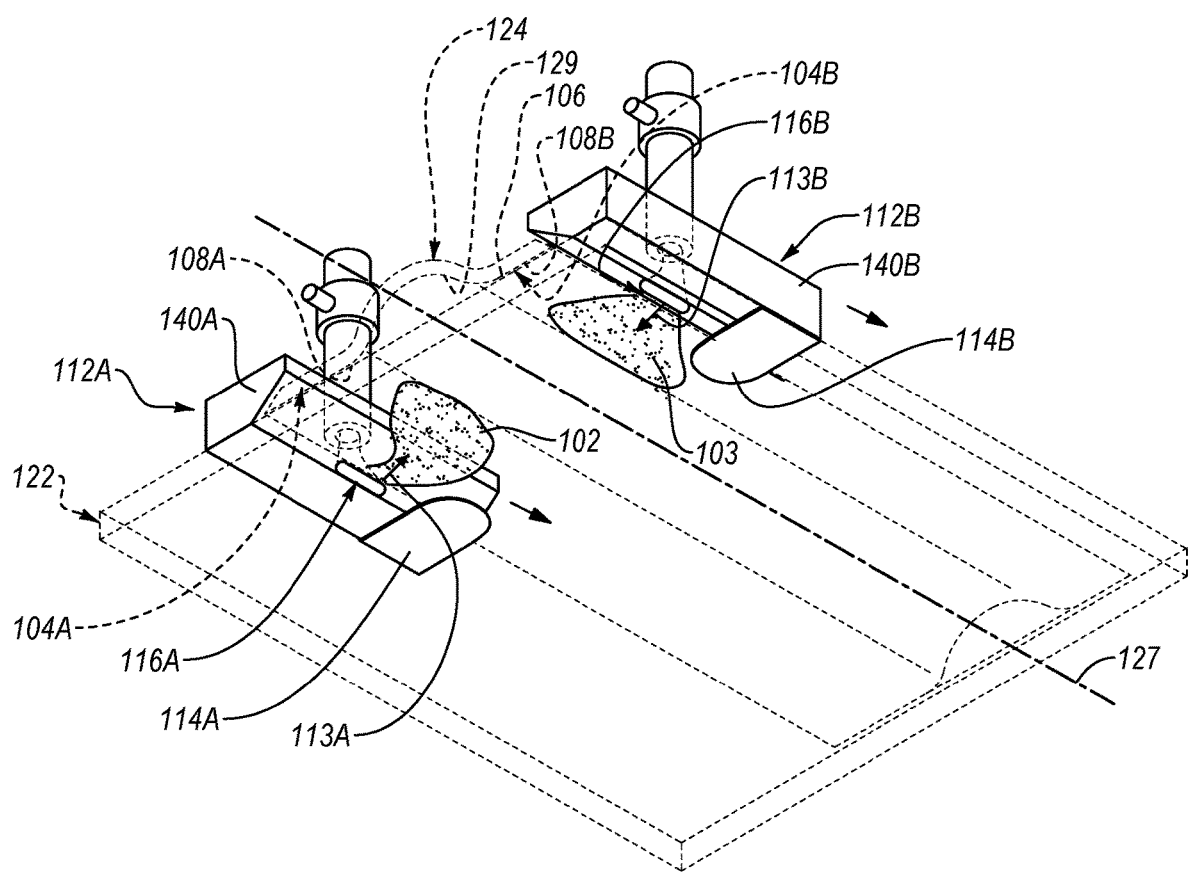
FIG. 6 is a schematic, perspective view of a first nozzle and a second nozzle of the apparatus of FIG. 1, according to one or more examples of the subject matter, disclosed herein.
Figure 7:
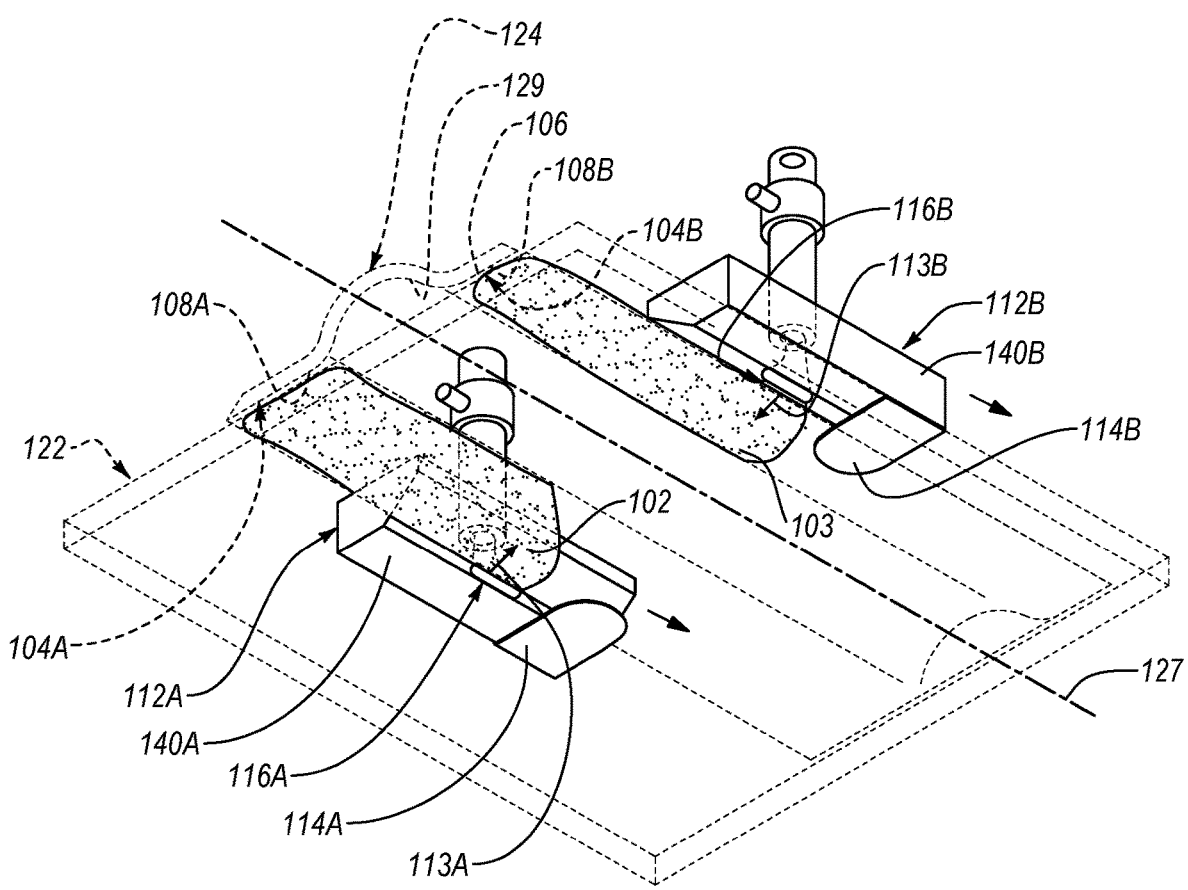
FIG. 7 is a schematic, perspective view of a first nozzle and a second nozzle of the apparatus of FIG. 1, according to one or more examples of the subject matter, disclosed herein.
Figure 8:
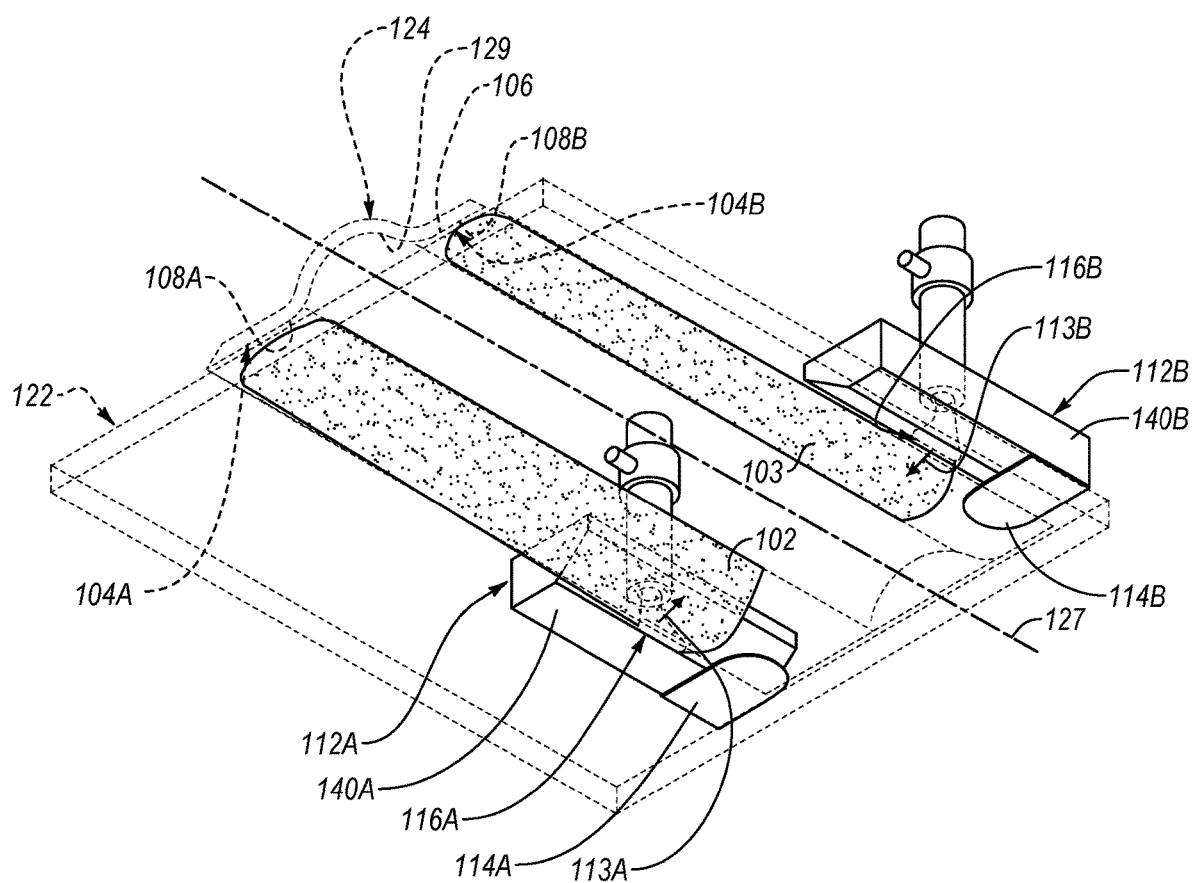
FIG. 8 is a schematic, perspective view of a first nozzle and a second nozzle of the apparatus of FIG. 1, according to one or more examples of the subject matter, disclosed herein.

Referring to FIGS. 6-8, illustrated is a progression of first volume of adhesive 102 and second volume of adhesive 103 being dispensed between first part 122 and second part 124 as end effector 100, and thus first nozzle 112A and second nozzle 112B, is translationally moved relative to first part 122 and second part 124.

Referring generally to FIGS. 9A, 9B, and 9C and particularly to, e.g., FIGS. 2A-4 for illustrative purposes only and not by way of limitation, the following portion of this paragraph delineates example 21 of the subject matter, disclosed herein. According to example 21, which encompasses example 20, above, method 200 further comprises, simultaneously with (block 214) translationally moving end effector 100 relative to first part 122 and second part 124, (block 216) rolling first ultrasonic-sensor roller 160A along first outer surface 120A of second part 124. First outer surface 120A and first second-part faying surface 108A face away from each other. Method 200 additionally comprises, simultaneously with (block 214) translationally moving end effector 100 relative to first part 122 and second part 124, (block 218) rolling second ultrasonic-sensor roller 160B along second outer surface 120B of second part 124. Second outer surface 120B and second second-part faying surface 108B face away from each other.

Rolling first ultrasonic-sensor roller 160A along first outer surface 120A of second part 124 and rolling second ultrasonic-sensor roller 160B along second outer surface 120B of second part 124, due to the close proximity of first ultrasonic-sensor roller 160A and second ultrasonic-sensor roller 160B to space between first part 122 and second part 124, enable accurate detection of adhesive between first part 122 and second part 124. Additionally, first ultrasonic-sensor roller 160A and second ultrasonic-sensor roller 160B help to prevent movement of second part 124 away from first part 122 as first volume of adhesive 102 is dispensed into first space 104A and as second volume of adhesive 103 is dispensed into second space 104B.

Referring generally to FIGS. 9A, 9B, and 9C and particularly to, e.g., FIGS. 2A-8 for illustrative purposes only and not by way of limitation, the following portion of this paragraph delineates example 22 of the subject matter, disclosed herein. According to example 22, which encompasses example 21, above, method 200 further comprises (block 224), simultaneously with (block 206) dispensing first volume of adhesive 102 in the first direction and (block 210) dispensing second volume of adhesive 103 in the second direction, biasing first-nozzle separator plate 114A against first part 122. Method 200 additionally comprises (block 226), simultaneously with (block 206) dispensing first volume of adhesive 102 in the first direction and (block 210) dispensing second volume of adhesive 103 in the second direction, biasing second-nozzle separator plate 114B against first part 122.

Biasing first-nozzle separator plate 114A against first part 122 and biasing second-nozzle separator plate 114B against first part 122, simultaneously with dispensing adhesive, helps keep first-nozzle-body outlet port 116A and second-nozzle-body outlet port 116B in proper position relative to first part 122 to dispense adhesive between first part 122 and second part 124.

Referring generally to FIGS. 9A, 9B, and 9C and particularly to, e.g., FIGS. 2A-8 for illustrative purposes only and not by way of limitation, the following portion of this paragraph delineates example 23 of the subject matter, disclosed herein. According to example 23, which encompasses example 21 or 22, above, second part 124 further comprises non-faying surface 129, interposed between first second-part faying surface 108A and second second-part faying surface 108B. Non-faying surface 129 extends from first second-part faying surface 108A at first junction 109A and extends from second second-part faying surface 108B at second junction 109B. According to method 200, (block 208) detecting presence of first volume of adhesive 102 between first-part faying surface 106 and first second-part faying surface 108A comprises (block 228) detecting the presence of first volume of adhesive 102 at first junction 109A of first second-part faying surface 108A and non-faying surface 129. According to method 200, (block 212) detecting the presence of second volume of adhesive 103 between first-part faying surface 106 and second second-part faying surface 108B comprises (block 230) detecting presence of second volume of adhesive 103 at second junction 109B of second second-part faying surface 108B and non-faying surface 129.

Detecting the presence of first volume of adhesive 102 at first junction 109A and second volume of adhesive 103 at second junction 109B enables dispensing adhesive up to, but not beyond, first junction 109A and second junction 109B.

Referring generally to FIGS. 9A, 9B, and 9C and particularly to, e.g., FIGS. 2A-8 for illustrative purposes only and not by way of limitation, the following portion of this paragraph delineates example 24 of the subject matter, disclosed herein. According to example 24, which encompasses any one of examples 20 to 23, above, method 200 further comprises, in response to (block 208) detecting the presence of first volume of adhesive 102 between first-part faying surface 106 and first second-part faying surface 108A by using first ultrasonic-sensor roller 160A, (block 232) adjusting at least one of a rate, at which first volume of adhesive 102 is dispensed from first-nozzle-body outlet port 116A, or a rate, at which end effector 100 translationally moves relative to first part 122 and second part 124. Method 200 also comprises, in response to (block 212) detecting the presence of second volume of adhesive 103 between first-part faying surface 106 and second second-part faying surface 108B by using second ultrasonic-sensor roller 160B, (block 234) adjusting at least one of a rate, at which second volume of adhesive 103 is dispensed from second-nozzle-body outlet port 116B, or a rate, at which end effector 100 translationally moves relative to first part 122 and second part 124.

Adjusting at least one of a rate, at which first volume of adhesive 102 is dispensed from first-nozzle-body outlet port 116A, or a rate, at which end effector 100 translationally moves relative to first part 122 and second part 124, in response to detecting the presence of second volume of adhesive 102 enables controlling the extent of spread of first volume of adhesive 102 between first part 122 and first second-part faying surface 108A of second part 124. Similarly, adjusting at least one of a rate, at which second volume of adhesive 103 is dispensed from second-nozzle-body outlet port 116B, or a rate, at which end effector 100 translationally moves relative to first part 122 and second part 124, in response to detecting the presence of second volume of adhesive 103 enables controlling the extent of spread of second volume of adhesive 103 between first part 122 and second second-part faying surface 108B of second part 124.

Referring generally to FIGS. 9A, 9B, 9C and particularly to, e.g., FIGS. 2A-4 for illustrative purposes only and not by way of limitation, the following portion of this paragraph delineates example 25 of the subject matter, disclosed herein. According to example 25, which encompasses any one of examples 19 to 24, above, method 200 further comprises (block 236) preventing movement of second part 124 away from first part 122 beyond a predetermined distance, simultaneously with (block 206) dispensing first volume of adhesive 102 in the first direction and (block 210) dispensing second volume of adhesive 103 in the second direction.

Preventing movement of second part 124 away from first part 122 beyond a predetermined distance, when adhesive is being dispensed between first part 122 and second part 124, helps maintain a thickness of adhesive between first part 122 and second part 124 below a maximum thickness.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An end effector for adhesively attaching a first part to a second part, the end effector comprising:
    a support;
    a first nozzle, coupled to the support and movable relative to the support, wherein the first nozzle comprises:
        a first-nozzle body, comprising a first-nozzle-body outlet port; and
        a first-nozzle separator plate, extending from the first-nozzle body;
    a second nozzle, coupled to the support and movable relative to the support, wherein the second nozzle comprises:
        a second-nozzle body, comprising a second-nozzle-body outlet port; and
        a second-nozzle separator plate, extending from the second-nozzle body;
    a first ultrasonic-sensor roller, coupled to the support such that the first ultrasonic-sensor roller is rotatable relative to the support and is translationally fixed relative to the support, wherein the first ultrasonic-sensor roller is located between the first nozzle and the second nozzle; and
    a second ultrasonic-sensor roller, coupled to the support such that the second ultrasonic-sensor roller is rotatable relative to the support and is translationally fixed relative to the support, wherein the second ultrasonic-sensor roller is located between the first ultrasonic-sensor roller and the second nozzle.

2. The end effector according to claim 1, wherein each of the first ultrasonic-sensor roller and the second ultrasonic-sensor roller is configured to emit an ultrasonic signal and to detect a reflection of the ultrasonic signal.

3. The end effector according to claim 1, wherein the first ultrasonic-sensor roller and the second ultrasonic-sensor roller are located on opposite sides of a virtual plane, passing through the support.

4. The end effector according to claim 3, further comprising:
    a first arm, attached to the first nozzle and coupled to the support; and
    a second arm, attached to the second nozzle and coupled to the support
    wherein:
        the first arm is translationally movable relative to the support, along a first-arm axis, to one of a first-arm engaged position or a first-arm disengaged position;
        the second arm is translationally movable relative to the support, along a second-arm axis, to one of a second-arm engaged position or a second-arm disengaged position;
        the first-arm axis and the second-arm axis are perpendicular to the virtual plane; and
        the first-nozzle separator plate is closer to the second-nozzle separator plate when the first arm is in the first-arm engaged position and the second arm is in the second-arm engaged position than when the first arm is in the first-arm disengaged position and the second arm is in the second-arm disengaged position.

5. The end effector according to claim 4, wherein:
    the first nozzle is translationally movable relative to the first ultrasonic-sensor roller along the first-arm axis;

the first nozzle is translationally movable relative to the first arm in a direction, perpendicular to the first-arm axis;

the second nozzle is translationally movable relative to the second ultrasonic-sensor roller along the second-arm axis; and the second nozzle is translationally movable relative to the second arm in a direction, perpendicular to the second-arm axis.

6. The end effector according to claim 5, further comprising a first-nozzle biasing member, coupled to the first arm, and a second-nozzle biasing member, coupled to the second arm, wherein:

the first-nozzle biasing member is configured to bias the first nozzle such that the first-nozzle separator plate is biased away from the first-arm axis; and the second-nozzle biasing member is configured to bias the second nozzle such that the second-nozzle separator plate is biased away from the second-arm axis.

7. The end effector according to claim 4, wherein:

the first-nozzle-body outlet port is open in a first direction;

the second-nozzle-body outlet port is open in a second direction; and when the first arm is in the first-arm engaged position, and when the second arm is in the second-arm engaged position, the first nozzle and the second nozzle are oriented relative to each other such that a first virtual ray, corresponding with the first direction, is directed toward and is co-linear with a second virtual ray, corresponding with the second direction.

8. The end effector according to claim 4, wherein:

the first-nozzle separator plate comprises a first-nozzle-separator-plate first-part engagement surface and a first-nozzle-separator-plate second-part engagement surface, facing in opposite directions;

the first-nozzle-separator-plate first-part engagement surface and the first-nozzle-separator-plate second-part engagement surface are parallel to each other;

the second-nozzle separator plate comprises a second-nozzle-separator-plate first-part engagement surface and a second-nozzle-separator-plate second-part engagement surface, facing in opposite directions;

the second-nozzle-separator-plate first-part engagement surface and the second-nozzle-separator-plate second-part engagement surface are parallel to each other;

when the first arm is in the first-arm disengaged position, and the second arm is in the second-arm disengaged position, the first-nozzle-separator-plate first-part engagement surface and the second-nozzle-separator-plate first-part engagement surface are coplanar; and when the first arm is in the first-arm engaged position, and the second arm is in the second-arm engaged position, the first-nozzle-separator-plate first-part engagement surface and the second-nozzle-separator-plate first-part engagement surface are coplanar.

9. The end effector according to claim 4, wherein, when the first arm is in the first-arm engaged position, and when the second arm is in the second-arm engaged position:

a minimum distance between the first-nozzle separator plate and the second-nozzle separator plate is less than a minimum distance between the first-nozzle-body outlet port and the second-nozzle-body outlet port; and a minimum distance between the first ultrasonic-sensor roller and the second ultrasonic-sensor roller is less than the minimum distance between the first-nozzle separator plate and the second-nozzle separator plate.

10. The end effector according to claim 4, wherein:

the first-nozzle-body outlet port is open in a first direction;

the first-nozzle separator plate extends from the first-nozzle body in the first direction;

the second-nozzle-body outlet port is open in a second direction;

the second-nozzle separator plate extends from the second-nozzle body in the second direction; and when the first arm is in the first-arm engaged position, and the second arm is in the second-arm engaged position, the first nozzle and the second nozzle are oriented relative to each other such that a first virtual ray, corresponding with the first direction, and a second virtual ray, corresponding with the second direction, are co-planar.

11. The end effector according to claim 10, wherein:

the first ultrasonic-sensor roller is rotatable about a first axis;

the second ultrasonic-sensor roller is rotatable about a second axis;

the first axis is oblique relative to the first virtual ray, which corresponds with the first direction; and the second axis is oblique relative to the second virtual ray, which corresponds with the second direction.

12. The end effector according to claim 4, further comprising:

a first linear slide, coupling the first nozzle to the first arm such that the first nozzle is translatable relative to the first arm; and a second linear slide, coupling the second nozzle to the second arm such that the second nozzle is translatable relative to the second arm.

13. The end effector according to claim 4, further comprising:

a first actuator, coupled to the support and to the first arm, wherein the first actuator is selectively actuatable such that the first arm translationally moves to one of the first-arm engaged position or the first-arm disengaged position; and a second actuator, coupled to the support and the second arm, wherein the second actuator is selectively actuatable such that the second arm translationally moves to one of the second-arm engaged position or the second-arm disengaged position.

14. The end effector according to claim 1, wherein:

the first-nozzle-body outlet port is open in a first direction;

the second-nozzle-body outlet port is open in a second direction;

the first-nozzle separator plate extends from the first-nozzle body in the first direction;

the second-nozzle separator plate extends from the second-nozzle body in the second direction;

the first-nozzle separator plate is offset from the first-nozzle-body outlet port along a first-nozzle-body axis that is perpendicular to a first virtual ray, which corresponds to the first direction; and the second-nozzle separator plate is offset from the second-nozzle-body outlet port along a second-nozzle-body axis that is perpendicular to a second virtual ray, which corresponds to the second direction.

15. A method of using the end effector of claim 1 for adhesively attaching the first part, which comprises a first-part faying surface, to the second part, which comprises a first second-part faying surface and a second second-part faying surface, spaced away from the first second-part faying surface, the method comprising steps of:

moving the first nozzle relative to the support such that the first-nozzle separator plate is inserted between and separates the first-part faying surface and the first second-part faying surface;

moving the second nozzle relative to the support such that the second-nozzle separator plate is inserted between and separates the first-part faying surface and the second second-part faying surface;

with the first-nozzle separator plate inserted between and separating the first-part faying surface and the first second-part faying surface:

dispensing a first volume of adhesive, in a first direction, from the first-nozzle-body outlet port into a first space, defined between the first-part faying surface and the first second-part faying surface, wherein a first virtual ray corresponds with the first direction; and detecting presence of the first volume of adhesive between the first-part faying surface and the first second-part faying surface, by using the first ultrasonic-sensor roller; and with the second-nozzle separator plate inserted between and separating the first-part faying surface and the second second-part faying surface:

dispensing a second volume of adhesive, in a second direction, from the second-nozzle-body outlet port into a second space, defined between the first-part faying surface and the second second-part faying surface, wherein a second virtual ray corresponds with the second direction, and the first direction is toward and opposite the second direction; and detecting the presence of the second volume of adhesive between the first-part faying surface and the second second-part faying surface, by using the second ultrasonic-sensor roller.

16. The method according to claim 15, further comprising a step of translationally moving the end effector relative to the first part and the second part, perpendicular to the first virtual ray and the second virtual ray, simultaneously with the steps of dispensing the first volume of adhesive in the first direction and dispensing the second volume of adhesive in the second direction.

17. The method according to claim 16, further comprising, simultaneously with the step of translationally moving the end effector relative to the first part and the second part, steps of:

rolling the first ultrasonic-sensor roller along a first outer surface of the second part, wherein the first outer surface and the first second-part faying surface face away from each other; and rolling the second ultrasonic-sensor roller along a second outer surface of the second part, wherein the second outer surface and the second second-part faying surface face away from each other.

18. The method according to claim 17, further comprising, simultaneously with the steps of dispensing the first volume of adhesive in the first direction and dispensing the second volume of adhesive in the second direction, steps of:

biasing the first-nozzle separator plate against the first part; and biasing the second-nozzle separator plate against the first part.

19. The method according to claim 17, wherein:

the second part further comprises a non-faying surface, interposed between the first second-part faying surface and the second second-part faying surface, wherein the non-faying surface extends from the first second-part faying surface at a first junction and extends from the second second-part faying surface at a second junction;

the step of detecting the presence of the first volume of adhesive between the first-part faying surface and the first second-part faying surface comprises detecting the presence of the first volume of adhesive at the first junction of the first second-part faying surface and the non-faying surface; and the step of detecting the presence of the second volume of adhesive between the first-part faying surface and the second second-part faying surface comprises detecting the presence of the second volume of adhesive at the second junction of the second second-part faying surface and the non-faying surface.

20. The method according to claim 16, further comprising:

in response to detecting the presence of the first volume of adhesive between the first-part faying surface and the first second-part faying surface, by using the first ultrasonic-sensor roller, adjusting at least one of:
  a rate, at which the first volume of adhesive is dispensed from the first-nozzle-body outlet port; or
  a rate, at which the end effector translationally moves relative to the first part and the second part; and in response to detecting the presence of the second volume of adhesive between the first-part faying surface and the second second-part faying surface, by using the second ultrasonic-sensor roller, adjusting at least one of:
  a rate, at which the second volume of adhesive is dispensed from the second-nozzle-body outlet port; or
  a rate, at which the end effector translationally moves relative to the first part and the second part.

* * * * *